(12) United States Patent
Shapiro et al.

(10) Patent No.: US 8,193,948 B1
(45) Date of Patent: Jun. 5, 2012

(54) SYSTEM, MODULE, AND METHOD FOR PRESENTING RUNWAY ADVISORY INFORMATION TO A PILOT

(75) Inventors: Geoffrey A. Shapiro, Cedar Rapids, IA (US); Alena L. Benson, Seattle, WA (US); Matthew J. Carrico, Mount Vernon, IA (US); Randy H. Jacobson, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 364 days.

(21) Appl. No.: 12/570,019

(22) Filed: Sep. 30, 2009

(51) Int. Cl.
*G08B 23/00* (2006.01)

(52) U.S. Cl. ........ 340/965; 340/969; 340/971; 340/972; 340/980; 340/945; 340/947; 340/951; 340/953; 340/961; 701/8; 701/9; 701/11; 701/16; 701/18

(58) Field of Classification Search .................. 340/965, 340/969, 971, 972, 980, 945, 947, 951, 953, 340/961; 701/8, 9, 11, 16, 18
See application file for complete search history.

(56) References Cited

U.S. PATENT DOCUMENTS

| 7,206,698 | B2 * | 4/2007 | Conner et al. | 701/301 |
| 7,623,044 | B2 * | 11/2009 | Pepitone et al. | 340/950 |
| 2004/0225440 | A1 * | 11/2004 | Khatwa et al. | 701/301 |

OTHER PUBLICATIONS

U.S. Appl. No. 11/820,950, filed Jun. 21, 2007, Kenz et al.
"User Requirements for Aerodrome Mapping Information"; Aug. 23, 2005, Title page, Information page, Forward page, Executive Summary pages, and pp. A-1 through A-15; RTCA, Inc.; Washington D.C.

* cited by examiner

*Primary Examiner* — Tai T Nguyen
(74) *Attorney, Agent, or Firm* — Donna P. Suchy; Daniel M. Barbieri

(57) ABSTRACT

A present novel and non-trivial system, module, and method for presenting runway advisory information are disclosed. A runway reference may be established using data received from a source of navigation reference data, where such data could represent runway information, runway awareness zone information, landing awareness zone information, and/or runway threshold line information. Navigation data representative of at least aircraft location and input factor data may be received from a source. Phase of flight may be determined using input factor data, and a runway advisory data set may be generated as a function of phase of flight and the positional relationship between aircraft location and the runway reference. Runway advisory data set may be representative of advisory information comprised of visual runway advisory information, aural runway advisory information, tactile advisory information, or a combination thereof. A presentation system receives the runway advisory data set and presents advisory information.

21 Claims, 13 Drawing Sheets

SYSTEM, MODULE, AND METHOD FOR PRESENTING RUNWAY ADVISORY INFORMATION TO A PILOT

BACKGROUND OF THE INVENTION

1. Field of the Invention

This invention pertains generally to the field of display units and/or crew alerting units that provide flight and/or ground information to the pilot or flight crew of an aircraft.

2. Description of the Related Art

On Aug. 27, 2006, Comair Flight 191 was scheduled to fly from Lexington, Ky. to Atlanta, Ga., United States. Prior to takeoff from Lexington, the aircraft was assigned Runway 22 for takeoff, a runway 7,003 feet in length; however, the aircraft attempted to takeoff from Runway 26, a runway 3,500 feet in length. Based upon an estimated takeoff weight of 49,087 pounds and through the use of performance equations, the manufacturer calculated that 3,744 feet of runway would have been needed in order for the aircraft to reach its rotation speed of 138 knots with more runway needed to achieve lift-off. Because there was insufficient runway distance for takeoff, the aircraft crashed at the end of the runway, and 49 people onboard the aircraft perished.

The National Transportation Safety Board ("NTSB") determined that the probable cause for the incident was the flight crew members' failure to use available cues and aids to identify the aircraft's location on the airport surface during taxi and their failure to cross-check and verify that the aircraft was on the correct runway before takeoff. The NTSB attributed part of the accident to loss of positional awareness which is synonymous with situational awareness.

On the evening of Oct. 28, 2006, Continental Flight 1883 was a scheduled flight from Orlando, Fla. to Newark, N.J. At the end of the flight, the aircraft mistakenly landed of a taxiway at Newark Liberty International Airport about 30 minutes after sunset. The NTSB determined that the probable cause for the incident was the flight crew's misidentification of the parallel taxiway as the active runway.

On Sep. 13, 2008, a Hong Kong Airlines B-737-800 attempted to takeoff from a taxiway at Hong Kong International Airport rather than a runway. An air traffic controller raised the alarm when he saw the B-737-800 hurling down a taxiway parallel to the airport's north runway. The controller radioed the pilot and alerted him in time for him to abort the takeoff after approximately 500 meters.

Airport complexity, approach patterns, airborne and surface traffic, and on-time departure/arrival pressures are some of the factors which can make flying a real challenge for today's pilots. Significant improvements in avionics technologies have helped to improve the aviation safety record. Despite many improvements, situational awareness of the runway environment still remains a significant safety issue.

BRIEF SUMMARY OF THE INVENTION

The embodiments disclosed herein present at least one novel and non-trivial system, module, and method for generating and presenting runway advisory information to the pilot or air crew. The use of visual advisory information, aural advisory information, and tactile advisory information may be used to enhance a pilot's Situational Awareness of the runway environment In one embodiment, a system is disclosed for generating and presenting runway advisory information to a pilot. The system comprises a source for navigation data, a source for navigation reference data, a source of input factor data for providing data that could be applied real-time to a takeoff and/or landing profile, an advisory generating processor ("AG"), and a presentation system. After receiving data from each of these sources, an AG processor could generate a runway advisory data set representative of advisory information as a function of phase of flight and the positional relationship between aircraft location and a runway reference, where the phase of flight may be determined using input factor data and the runway reference may be established using the data received from the navigation reference data. After the runway advisory data set has been generated, the AG processor could provide the runway advisory data set to a presentation system for presenting runway advisory information on or through a presentation unit such as, but not limited to, a display unit and aural alert unit. As embodied herein, the display unit could be comprised of an HDD unit, a HUD unit, or both.

In another embodiment, a module is disclosed for generating and presenting runway advisory information to a pilot. The module comprises an input communications interface, an AG processor, and an output communications interface. The AG processor could receive data from a navigation data source, input factor data source, and navigation reference data source. Then, an AG processor could generate a runway advisory data set representative of advisory information as a function of phase of flight and the positional relationship between aircraft location and a runway reference, where the phase of flight may be determined using input factor data and the runway reference may be established using the data received from the navigation reference data. After the runway advisory data set has been generated, the AG processor could provide the runway advisory data set to a presentation system via an external communications interface, where runway advisory information may be presented on or through a presentation unit. As embodied herein, the module may be a module used in any aircraft system including, but not limited to, a navigation system, a flight management system, an input factor system, and presentation system. A module could be, but is not limited to, a printed circuit board (either in whole or in part) installed in a line replaceable unit.

In another embodiment, a method is disclosed for generating and presenting runway advisory information to a pilot. The method comprises receiving data from a navigation data source, input factor data source, and navigation reference data source, establishing a runway reference, determining a phase of flight, generating a runway advisory data set, and providing the runway advisory data set to a presentation system, whereby runway advisory information may be presented to a pilot.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
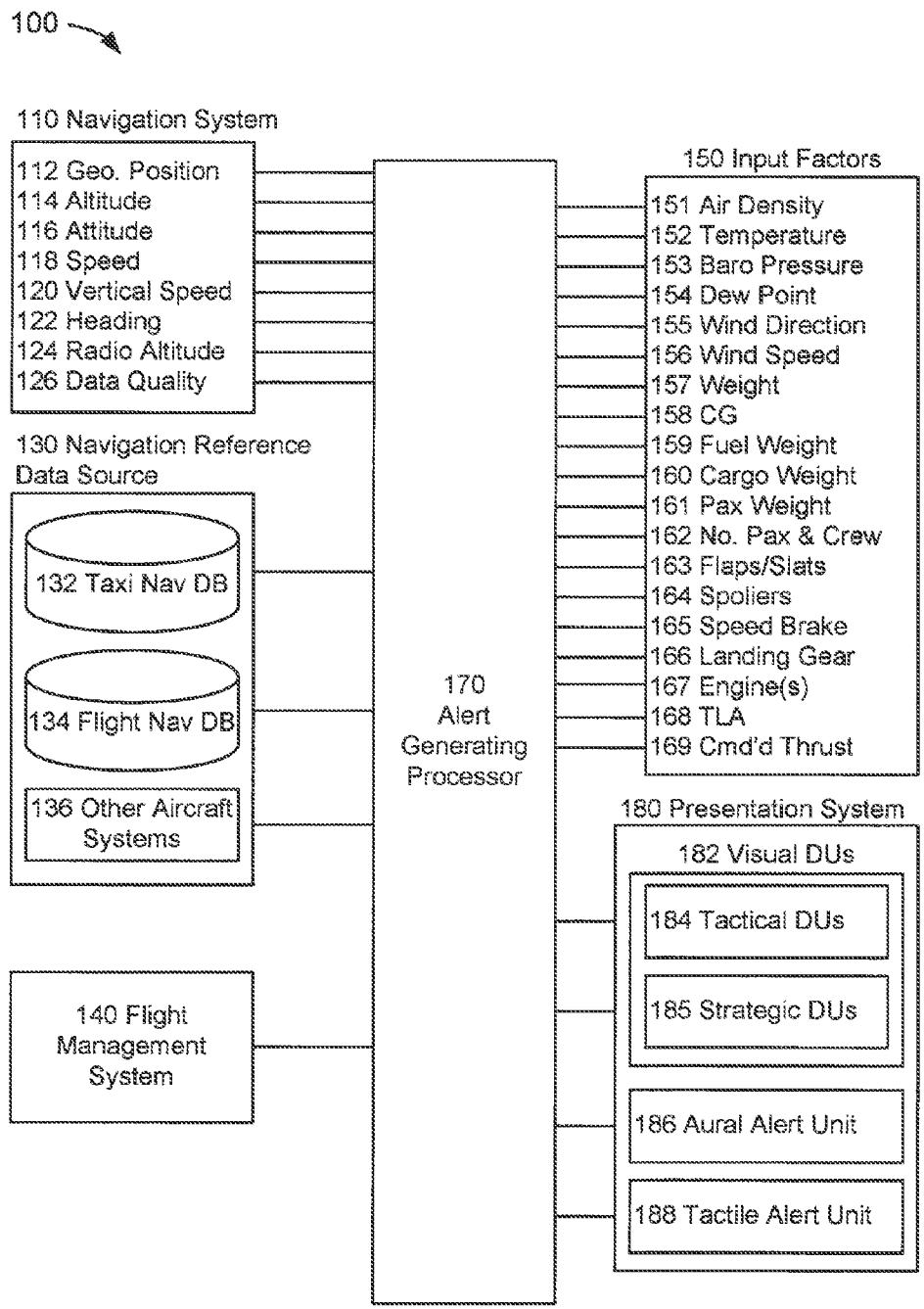
FIG. 1 depicts a block diagram of a runway advisory information presentation system.

FIG. 1 depicts a block diagram of a runway advisory information presentation system 100 suitable for implementation of the techniques described herein. The runway advisory information presentation system 100 of an embodiment of FIG. 1 includes navigation system 110, a navigation reference data source 130, a flight management system ("FMS") 140, input factors 150, an advisory generating (AG") processor 170, and a presentation system 180.

In an embodiment of FIG. 1, the navigation system 110 comprises the system or systems that could provide navigation data information in an aircraft. It should be noted that data, as embodied herein for any source or system in an aircraft, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles. The navigation system 110 may include, but is not limited to, an air/data system, an attitude heading reference system, an inertial guidance system (or inertial reference system), a radio navigation system, and a global navigation satellite system (or satellite navigation system), all of which are known to those skilled in the art. As embodied herein, the navigation system 110 could provide navigation data including, but not limited to, geographic position (or aircraft location) 112, altitude 114, attitude 116, speed 118, vertical speed 120, heading 122, radio altitude 124, and data quality 126. As embodied herein, aircraft position comprises geographic position (e.g., latitude and longitude coordinates) and altitude, and direction may be derived from either geographic position, aircraft position, or both. Also, aircraft orientation may include pitch, roll, and/or yaw information related to the attitude of the aircraft. As embodied herein, navigation system data may be provided to the AG processor 170 for subsequent processing as discussed herein.

In an embodiment of FIG. 1, a navigation reference data source 130 could comprise any source of runway data. The navigation reference data source 130 may include, but is not limited to, a taxi navigation database 132, a flight navigation database 134, and other aircraft systems 136.

The taxi navigation database 132, such as one described by Krenz et al in U.S. patent application Ser. No. 11/820,950, may be used to store airport data that may be comprised of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

The taxi navigation database 132 could comprise an aerodrome mapping database ("AMDB") as described in the following document published by RTCA, Incorporated: RTCA DO-272A entitled "User Requirements for Aerodrome Mapping Information." RTCA DO-272A provides for aerodrome surface mapping requirements for aeronautical uses particularly on-board aircraft. It should be noted that any standards are subject to change. Those skilled in the art appreciate that standards in the aviation industry including, but not limited to, RTCA DO-272A and ARINC 424 as discussed in detail below, may be subject to change with future amendments or revisions, that additional content may be incorporated in future revisions, and/or that other standards related to the subject matter may be adopted. The embodiments disclosed herein are flexible enough to include such future changes and/or adoptions of aviation standards.

The flight navigation database 134 may contain records which provide runway data. The flight navigation database 134 could contain data associated with ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, GNSS Landing Systems. Such flight navigation database 134 could be provided by an aircraft system such as, but not limited to, the FMS 140. It should be noted that, although it is presented herein as the navigation reference data source 130, flight navigation database 134 is commonly made part of the FMS 140. For the embodiments disclosed herein, flight navigation database 134 is not limited to the database common to the FMS 140.

Other aircraft systems 136 could comprise a source of runway data. For example, both a terrain awareness and warning system ("TAWS") and an airspace awareness and warning system ("AAWS") may utilize airport data which may contain, in part, runway data. As embodied herein, the navigation reference data source 130 could provide runway data to the AG processor 170 for subsequent processing as discussed herein.

In an embodiment of FIG. 1, the FMS 140 may perform a variety of functions performed to help the crew in the management of the flight; these functions are known to those skilled in the art. These functions could include receiving a flight plan and constructing a lateral and vertical flight plan from the flight plan. A pilot could create a flight plan from waypoints stored in a database or select a flight plan stored in a database of the FMS 140. Also, a flight plan may be modified at any time.

In a lateral flight plan, the FMS could perform many functions including, but not limited to, navigational computations, radio navigation aids selections, and providing lateral flight information which could maintain the aircraft along the flight plan from takeoff to approach. In a vertical flight plan, an FMS could compute an optimum speed at each point, other characteristic speeds, and the aircraft weight and center of gravity. Then, it could compute predictions along the flight plan based on these speeds and weight. It could also provide vertical flight information in reference to such predictions. Other miscellaneous performance computations are also made. Computations and underlying algorithms performed by the FMS 140 are known to those skilled in the art.

A pilot or flight crew may initialize an FMS including, but not limited to, the selection of a flight plan, where such flight plan could provide the basis for all computations and displays. A flight plan may be composed of various lateral and vertical elements that may be defined during initialization, and may be defined from navigation data stored in an FMS database.

Lateral elements of a flight plan could include origin airport and runway; a departure procedure ("DP") that may include, but is not limited to, a standard instrument departure ("SID"); an enroute transition; enroute airways and waypoints; an arrival procedure that may include, but is not limited to, an enroute transition, a standard terminal arrival route ("STAR") procedure, a STAR-approach transition, an approach procedure, a missed approach procedure, and a holding procedure; and a flight plan to an alternate airport. Such procedures may be defined by various legs and waypoints between legs.

Vertical elements could include a takeoff altitude which may include, but is not limited to, a thrust reduction and/or acceleration altitudes; altitude constraints at one or more waypoints located along the flight path; vertical speed and/or flight path angle constraints at one or more waypoints located along the flight plan; speed constraints at one or more waypoints along the flight plan; climb and descent speed limits; climb and descent step legs; and cruise flight levels. A vertical element could also include a cost index for the flight plan, a parameter that may determine flight time cost in units of fuel flow for providing fuel cost versus time cost information. The cost index could include a scale of optimization, where a low cost index may be associated with optimizing fuel consumption and a high cost index may be associated with optimizing time.

As noted above, a flight plan may be changed or revised at any time after initialization. For lateral elements, waypoints could be inserted or deleted, holding procedures could be inserted or modified, legs to fly directly to waypoints may be inserted, a DP or STAR procedure may be modified or introduced into the flight plan, the destination or alternate airport may be changed, and/or an offset path could be created to avoid hazardous meteorological conditions. For vertical elements, constraints associated with altitude, vertical speed, flight path angle, and speed between waypoints could be inserted, modified, or deleted; climb and descent speeds could be inserted, modified, or deleted as well as climb and descent step legs. Cruise flight levels and a cost index could be modified.

Returning to FIG. 1, input factors 150 are determining factors which may be used to determine one or more phases of flight as disclosed in detail below. Input factors 150 may be provided by a plurality of aircraft systems or components thereof. Input factors 150 could include real-time system or sensor data, signal input from a plurality of aircraft systems or sensors, and information from any database or source. As embodied herein, a source of input factors may comprise of one aircraft system or a collection of more than one aircraft system that may provide input factor(s). As embodied herein, the input factor 150 could provide data or a signal of any form containing information that may be provided to and received by the AG processor 170.

As embodied herein, input factors 150 could include those inputs defined above as being part of the navigation system 110 (e.g., geographic position 112, altitude 114, attitude 116, speed 118, vertical speed 120, heading 122, radio altitude 124, and navigation data quality 126). Moreover, any input provided by the navigation system 110 could be considered an input factor for the purposes of the embodiments herein. In other words, the navigation system 110 may be considered as part of an input factor data source providing a subset of input factors 150. The presentation of the specific inputs from navigation system 110 in FIG. 1 should not be construed as an exclusion or limitation to input factors 150. As embodied herein, input factors 150 may include information from any data or information source available to the processor 170 including, but not limited to, the navigation reference data source 130 and the FMS 140. In other words, a navigation reference data source 130 and FMS 140 may be considered collectively as an input factor data source providing a subset of input factors 150. The presentation of an object data source and a runway data source as separate item numbers 130 and 140 should not be construed as an exclusion or limitation to input factors 150.

In an embodiment herein, input factors 150 may be selected by a manufacturer or end user as a factor for determining phase of flight. Additionally, input factors 150 may be selected by a manufacturer or end user as a factor for determining the adequacies of runway distances during a takeoff phase of flight, final approach phase of flight, or both using aircraft performance equations, the use of which are known to those skilled in the art.

To provide a simple example of how input factors 150 may be used in the embodiments herein, suppose aircraft performance equations corresponding to takeoff distance or landing and rollout distance comprise meteorological or environmental criteria such as pressure altitude, temperature, wind, and weight. Those skilled in the art understand that runway distance may be affected by a plurality of factors including, but not limited to, pressure altitude, temperature, humidity, wind, and weight. Here, factors representing altitude 114, temperature 152, barometric pressure 153, dew point 154, wind direction 155, wind speed 156, and current weight 157 may be provided as input factors 150 to AG processor 170 for subsequent processing in accordance with the criteria corresponding to aircraft performance equations. The AG processor 170 is able to determine applicable runway distance that is real-time because it is based upon input factors 150.

In the following paragraphs, other examples of performance factors are provided to illustrate the ability with which a manufacturer or end user may define a phase of flight or adequacy of runway distance(s) as embodied herein. These illustrations are intended to provide exemplary criteria and performance factors that may be used in a procedure runway advisory information presentation system 100, and are not intended to provide a limitation to the embodiments discussed herein in any way, shape, or form.

As noted above, input factors 150 may include some of those inputs provided to the AG processor 170 by the navigation system 110, even though they are not enumerated under item 150 of FIG. 1; input factors that could affect the performance of the aircraft may include some inputs that are provided by any aircraft system other than a navigation system 110. As embodied herein, one or more input factors 150 could be included in the computation of another input factor. For instance, wind direction 155 and wind speed 156 have been considered in a computation of speed 118, and barometric pressure 153 could have been considered in a computation of altitude 114. In such instances, the processor 170 may be programmed to accept only one of these factors.

In another example, a runway performance could include weight and balance climb criteria. If so, input factors 150 could include, but are not limited to, data representative of aircraft empty weight 157, center of gravity ("CG") 158, weight of fuel 159, weight of cargo 160, weight of passengers 161, and number of passengers and crew 162 (for which a standard weight can be applied). In another example, a runway performance could include aircraft takeoff and/or landing configuration. If so, input factors 150 could include, but are not limited to, data representative of an aircraft's flaps and slats 163, spoilers 164, speed brake 165, and landing gear 166 configurations. In another example, a takeoff performance could include engine performance takeoff and/or climb criteria. If so, input factors 150 could include, but are not limited to, data representative of engine performance or status 167 or available thrust. In another example, the determination of runway performance could include an assumption that one engine of a multi-engine aircraft is inoperative.

In an embodiment of FIG. 1, the AG processor 170 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The AG processor 150 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, the AG processor 170 could be a processor(s) used by or in conjunction with any other system of the aircraft including, but not limited to, a processor(s) associated with the navigation system 110, the FMS 140, any system providing one or more input factors 150, and a presentation system 180 which could include a vision system such as, but not limited to, a synthetic vision system ("SVS"), an enhanced vision system ("EVS"), a combined SVS-EVS, or any combination thereof; for example, although depicted separately in FIG. 1, the AG processor 170 could be included or made part of presentation system 180 or any of the other separately enumerated systems.

The AG processor 170 may be programmed or configured to receive as input data representative of information obtained from various systems and/or sources including, but not limited to, navigation system 110, the navigation reference data source 130, an FMS 140, and/or one or more input factors 150. As embodied herein, the terms "programmed" and "configured" are synonymous. The AG processor 170 may be electronically coupled to systems and/or sources to facilitate the receipt of input data; as embodied herein, operatively coupled may be considered as interchangeable with electronically coupled. The AG processor 170 may be programmed or configured to execute the methods discussed in detail below. An AG processor 170 may be programmed or configured to provide output data to various systems and/or units including, but not limited to, the presentation system 180. The AG processor 170 may be electronically coupled to systems and/or units to facilitate the providing of output data representative of a procedure. It is not necessary that a direct connection be made; instead, such receipt of input data and the providing of output data could be provided through a data bus or through a wireless network.

The presentation system 180 could be comprised of any presentation unit which may present the pilot with visual, aural, and/or tactile indications regarding runway advisory information including, but not limited to, visual display units 182, aural alerting unit 186, and/or tactile alerting unit 188. Visual display units 182 could be comprised of a tactical display unit(s) 184, and/or a strategic display unit(s) 185. As embodied herein, visual display units 182 may include a vision system (not shown) which generates an image data set which represents the image displayed on a display unit. Vision systems include, but are not limited to, SVS, EVS, combined SVS-EVS, or combination thereof.

A tactical display unit 184 could be any unit which presents tactical information to the crew relative to the instant or immediate control of the aircraft, whether the aircraft is in flight or on the ground. The tactical display unit 184 could be a Head-Down Display ("HDD") unit and/or a Head-Up Display ("HUD") unit. An HDD unit is typically a unit mounted to an aircraft's flight instrument panel located in front of a pilot and below the windshield and the pilot's field of vision. A HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot.

The tactical display unit 184 could display the same information found on a primary flight display ("PFD"), such as "basic T" information (i.e., airspeed, attitude, altitude, and heading). Although it may provide the same information as that of a PFD, the tactical display unit 184 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The tactical display unit 184 is designed to provide flexible configurations which may be tailored to the desired configuration specified by a buyer or user of the aircraft.

Figure 2A:
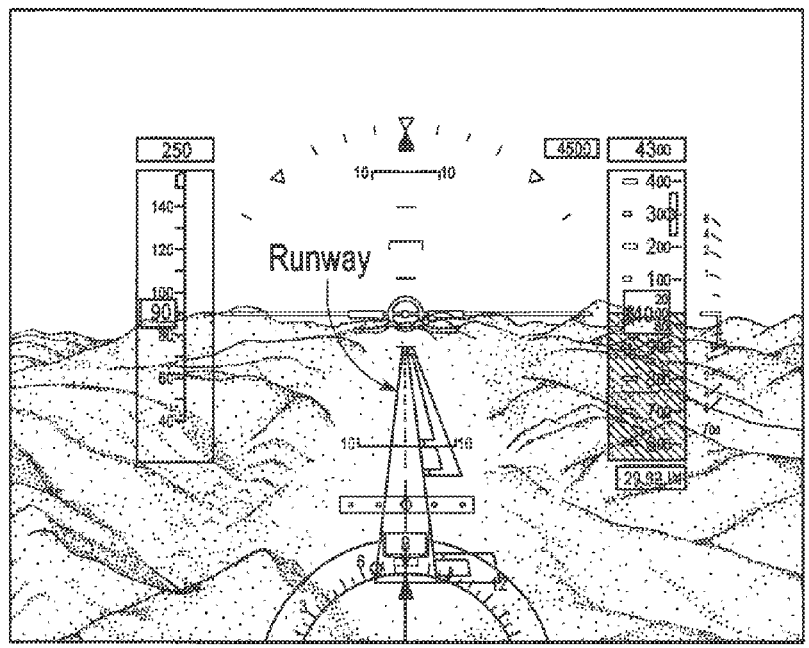
FIG. 2A provides an exemplary depiction of an HDD unit for presenting tactical information against the background of a three-dimensional image of terrain and sky.

FIG. 2A provides an exemplary depiction of an HDD unit for presenting tactical information to the pilot or flight crew against the background of a three-dimensional image of terrain and sky; an HDD unit could be employed as a display unit in a synthetic vision system ("SVS"), an enhanced vision system ("EVS"), or combination of both ("combined SVS-EVS"). FIG. 2A provides an exemplary depiction of an HDD unit presenting an image of a runway located within a three-dimensional display of terrain. It should be noted that the tactical information depicted on the HDD unit and has been made minimal for the sake of presentation and is not indicative of the plurality of indications or information with which it may be configured. Because the indications or information shown in FIG. 2A are well-known to those skilled in the art, a discussion of the specific tactical information shown in FIG. 2A is not provided herein.

Figure 2B:
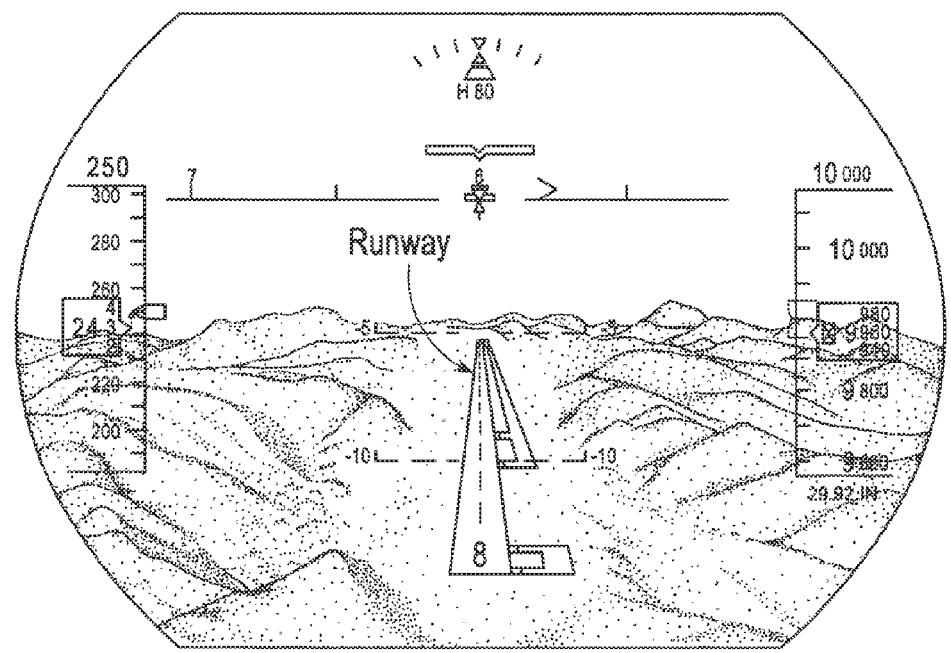
FIG. 2B provides an exemplary depiction of a HUD unit for presenting tactical information against the background of a three-dimensional image of terrain and sky.

FIG. 2B provides an exemplary depiction of a HUD unit for presenting tactical information to the pilot or flight crew against the background of a three-dimensional image of terrain and sky; a HUD unit could be employed as a display unit in a synthetic vision system, an enhanced vision system, or combination of both. FIG. 2B provides an exemplary depiction of a HUD unit presenting an image of a runway located within a three-dimensional display of terrain. It should be noted that the tactical information depicted on the HUD unit has been made minimal for the sake of presentation and is not indicative of the plurality of indications or information with which it may be configured.

Returning to FIG. 1, a strategic display unit 185 could be any unit which presents strategic information to the crew relative to the intended future state(s) of the aircraft (e.g. intended location in space at specified times) along with information providing contextual information to the crew (e.g. terrain, navigation aids, geopolitical boundaries, airspace boundaries, etc.) about such state(s). One example of such display unit is commonly referred to as a Navigation Display. In some configurations, the strategic display unit could be part of an Electronic Flight Information System ("EFIS"). On these systems, terrain information may be displayed separately or simultaneously with information of other systems. In one embodiment herein, terrain information may be displayed simultaneously with weather information with no loss or a negligible loss of displayed information. Other alternative strategic displays may include, but are not limited to: Electronic Flight Bag displays and electronic airport surface chart and/or map displays.

Figure 2C:
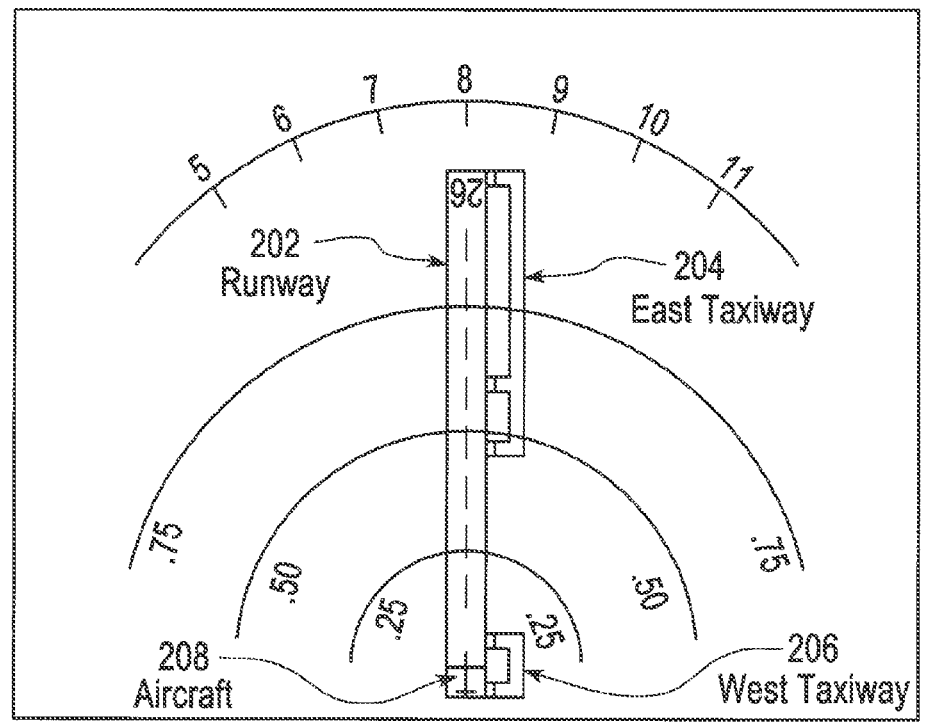
FIG. 2C depicts a runway and two taxiways presented on a display unit when an aircraft is located on the runway.

FIG. 2C provides an exemplary depiction of the strategic display unit 185 for presenting strategic information to the pilot or flight crew. FIG. 2C provides an exemplary depiction of how a runway 202, east taxiway 204, and west taxiway 206 may be presented on the strategic display unit 185 when an aircraft 208 is on the ground. As shown in FIG. 2C, aircraft 208 is positioned on the threshold of Runway 8. It should be noted that the strategic information depicted has been made minimal for the sake of presentation and is not indicative of the plurality of indications or information with which it may be configured.

Figure 2D:
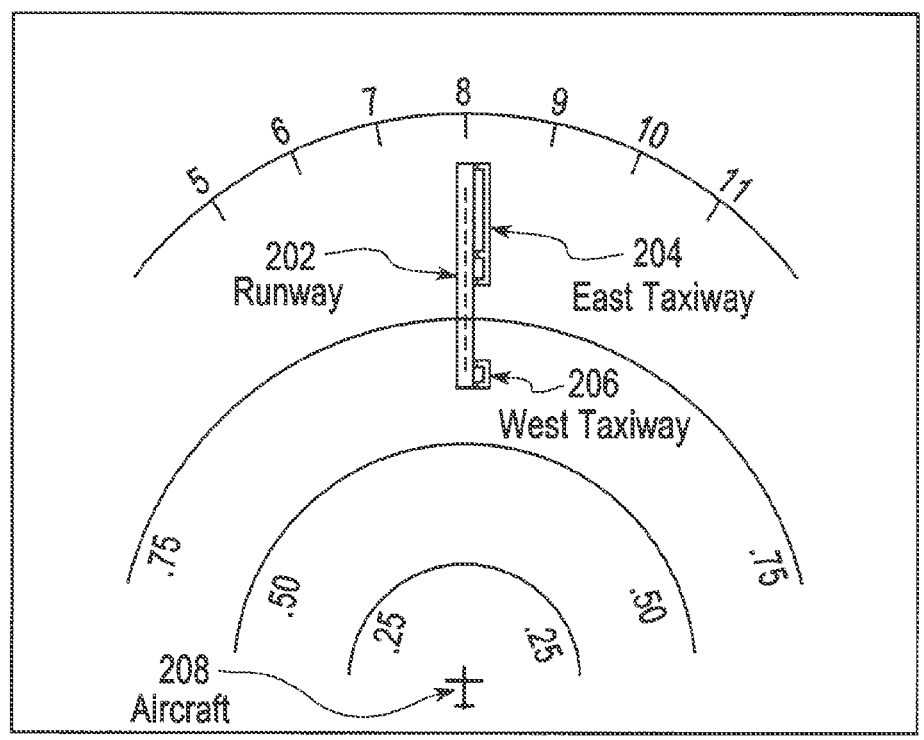
FIG. 2D depicts a runway and two taxiways presented on a display unit when an aircraft is approaching a runway.

FIG. 2D provides an exemplary depiction of the strategic display unit 185 for presenting strategic information to the pilot or flight crew. FIG. 2D provides an exemplary depiction of how the same runway 202, east taxiway 204, and west taxiway 206 may be presented on the strategic display unit 185 when aircraft 208 is approaching an airport. As shown in FIG. 2C, aircraft 208 is flying towards the approach end of Runway 8. It should be noted that the strategic information depicted has been made minimal for the sake of presentation and is not indicative of the plurality of indications or information with which it may be configured. Because the indications or information shown in FIGS. 2C and 2D are well-known to those skilled in the art, a discussion of the specific strategic information depicted is not provided herein.

Returning to FIG. 1, visual display units 182 could be capable of presenting advisory information which may be information that is projected or displayed on a cockpit display unit to present a condition, situation, or event to the pilot including other display units in addition to the tactical display unit 184 and strategic display unit 185. Advisory information may include alerts and/or non-alert(s). Alerts may be based on level of threat or conditions requiring immediate crew awareness. Caution alerts may be alerts requiring immediate crew awareness and subsequent flight crew response. Warning alerts may be alerts requiring immediate flight crew awareness and subsequent flight crew response. As embodied herein, both caution and warning alerts may be presented in combination with or simultaneous to aural alerts and/or tactile alerts. Non-alerts may be alerts requiring flight crew awareness and may require subsequent flight crew response. Alerts may be presented visually by depicting one or more colors that may be presented on a display unit indicating one or more levels of threat. For the purpose of illustration and not limitation, amber or yellow may indicate a caution alert, red may indicate a warning alert, and green, white or cyan may indicate a non-alert.

In one embodiment, visual alerts could be presented in a textual form including text messages such as an amber or yellow "RUNWAY TOO SHORT" when the conditions for a caution alert have been met or a red "RUNWAY TOO SHORT" when the conditions for a warning alert have been met. In another embodiment, visual alerts could be presented in non-textual forms including, but not limited to, highlighting one or more surfaces depicted on a display unit as discussed in detail below. In another embodiment, non-textual and textual forms could be displayed in color to indicate the level of threat, e.g., amber or yellow may indicate a caution alert and red may indicate a warning alert. In another embodiment, non-textual and textual forms could remain steady or flash intermittently, where such flashing could depend on remaining runway distance, where such flashing could represent a specific range of distance.

It should be noted that the disclosure herein will discuss visual alerts which present a textual form with a plurality of words included. As used herein, the words should be construed as generic words for advisory information provided to the pilot and not words which limit the presentation to the recipient. For the purpose of illustration and not limitation, a non-exhaustive list of words that may be used (where such words may depend on the conditions experience by an aircraft either on the ground or in flight) could include, but are limited to, "NOT A RUNWAY," "RUNWAY TOO SHORT," "FMS RUNWAY DISAGREE," "NO RUNWAY," and "DRIFTING FROM RUNWAY."

Returning to FIG. 1, an aural alerting unit 186 may be any unit capable of producing aural alerts. Aural alerts may be discrete sounds, tones, and/or verbal statements used to annunciate a condition, situation, or event. In one embodiment, an aural alert could call out "CAUTION—RUNWAY TOO SHORT" when the conditions for a caution alert have been met or "WARNING—RUNWAY TOO SHORT" when the conditions for a warning alert have been met, and either or both could be accompanied with tonal indicators. As embodied herein, both caution and warning aural alerts could be presented in combination with or simultaneous to visual alerts and/or tactile alerts.

In an embodiment of FIG. 1, a tactile alerting unit 188 may be any unit capable of producing tactile alerts. Tactile alerts may be any tactile stimulus to present a condition, situation, or event to the pilot. As embodied herein, tactile alerts could be presented in combination with or simultaneous to visual alerts and/or tactile alerts.

The advantages and benefits of the embodiments discussed herein may be illustrated by showing examples of the establishment of runway references may be utilized in the generation and/or presentation of alert information. Such runway references could include, but are not limited to, a runway awareness zone and a threshold line. To demonstrate how a runway awareness zone may be established using location information provided from one or more navigation reference data sources 130, the drawings of FIG. 3 depict a runway, an east taxiway, and a west taxiway. For the purpose of discussion only, Runway 8-26 of Rifle/Garfield County Regional Airport ("RIL") in the State of Colorado, United States has been selected for discussion. As discussed herein, the runway depiction and runway data information discussed in the drawings of FIG. 3 may have been modified for the sake of illustration and is not suitable for navigation. For example, the runway is not drawn to scale and the runway markings have been modified from the actual markings for the sake of brevity.

Figure 3A:
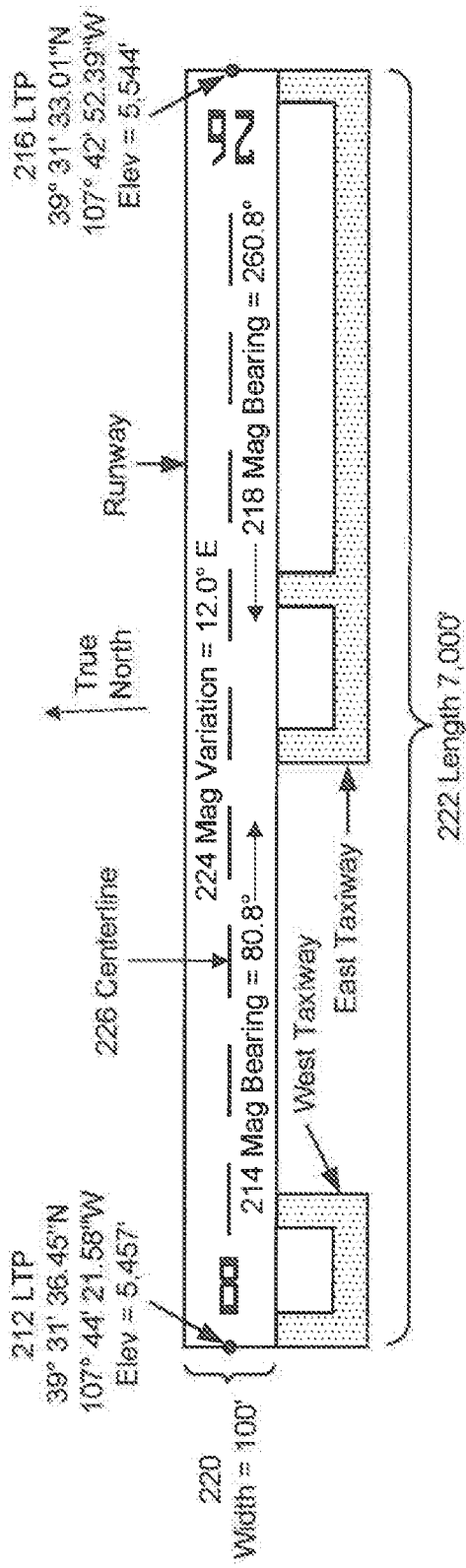
FIG. 3A illustrates a runway with runway references.

The navigation reference data source 130 may be employed for delineating the boundaries of a runway awareness zone. In one embodiment, runway information contained in a runway record from a flight navigation database 132 employing standards of the ARINC 424 specification could be used to derive four corners of a runway awareness zone from which the boundaries could be delineated. For example, fields of the runway record include data representative of, but not limited to, the landing threshold point ("LTP"), the elevation of the LTP, runway width, the magnetic bearing, and the magnetic variation of the runway. The data associated with Runway 8-26, rounded off pursuant to the ARINC specification, is shown in FIG. 3A. The data indicates that the LTP 212 for Runway 8 is located at latitude ("lat.") 39°31'36.45"N, longitude ("long.") 107°44'21.58"W and has an elevation of 5,547' mean sea level ("MSL"); the magnetic bearing 214 of the runway is 80.8°. The data indicates that the LTP 216 for Runway 26 is located at lat. 39°31'33.01"N, long. 107°42'52.39"W and has an elevation of 5,544' MSL; the magnetic bearing 218 of the runway is 260.8°. The data indicates that the width 220 of Runway 8-26 is 100', the length 222 is 7,000', and magnetic variation 224 is 12.0° E.

Figure 3B:
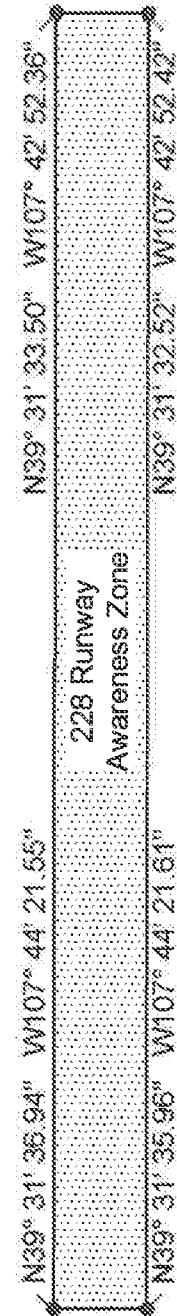
FIG. 3B illustrates a runway awareness zone delineated by latitude/longitude coordinates of the locations of the four corners.

There are a plurality of techniques in which a runway awareness zone may be determined from which a manufacturer or end-user may choose in establishing a runway awareness zone. In one embodiment, four corners of Runway 8-26 may be determined using the data of LTP 212, LTP 216, and width 220 by applying one or more formulas known to those skilled in the art, where LTP 212 and LTP 216 may be used to determine a runway centerline 226 from which half of the width 220 may be applied to each side of the centerline. The determination of the location of the four corners may be used to delineate the boundaries of a runway awareness zone 228. As shown in FIG. 3B, the runway awareness zone boundaries are delineated by latitude/longitude coordinates of the locations of the four corners. These boundaries could be used for either Runway 8 or Runway 26. Although not shown, it should be noted that the application of a great circle formula renders the length of Runway 8-26 to be 6,997.30°.

In an alternative embodiment, the four corners used to delineated boundaries of a runway awareness zone for Runway 8 may be established with a derivation technique using LTP 212, magnetic bearing 214, runway width 220, runway length 222, and magnetic variation 224 by applying one or more formulas, where a runway centerline 226 may be projected from the LTP 212 for a distance of runway length 222 in a true direction determined using magnetic bearing 214 and magnetic variation 224. Once the runway centerline has been determined, width 220 may be applied to each side of the centerline. The application of this technique would render a different runway awareness zone than in the preceding paragraph due, in part, to the rounding errors. Similarly, the four corners used to delineated boundaries of a runway awareness zone for Runway 26 may be determined using LTP 216, magnetic bearing 218, runway width 220, runway length 222, and magnetic variation 224. It should be noted that separate application of the technique for Runway 8 and Runway 26 discussed in this paragraph may render a different runway awareness zone for each runway which may, in turn, be different from the runway awareness zone determined in the preceding paragraph. As such, the manufacturer or end-user is provided with the flexibility of choosing which technique(s) to apply.

Although the preceding discussion has drawn from record fields established in accordance with a specific ARINC specification, the embodiments herein are not limited to the specification or those specific record fields discussed. Rather, the preceding discussion has provided examples of how a field or fields of a specific record could be used to establish a runway awareness zone. The embodiments and discussion herein with respect to any ARINC specification are illustrations intended solely to provide examples and are in no way intended to be limited to those discussed and presented herein. As discussed above, an AMDB employing with the standards of RTCA DO-272A may be used to establish a runway awareness zone.

It should be noted that, as embodied herein, employing a derivation technique to establish a runway awareness zone may not be necessary when data provided by one or more data sources may already be representative of such runway awareness zone; for example, the latitude/longitude coordinates used for delineating the boundaries of a runway awareness zone be provided by one or more data sources. As embodied herein, a runway awareness zone may be established in a plurality of ways.

In an additional embodiment, a runway awareness zone may include a buffer zone by, for example, extending a runway centerline and/or expanding the width of a runway. As embodied herein, a manufacturer or end-user may have a plurality of options from which to choose how a runway awareness zone may incorporate a buffer zone. For the purpose of illustration and not limitation, a buffer zone could extend a runway centerline by including a displaced threshold. Known to those skilled in the art, a value of the distance of a displaced threshold may be included as a field in a runway record in a database. Also, a buffer zone could expand the width of the runway to a fixed- or variable-distance as selected and/or configurable by a manufacturer and/or end-user; for example, such zone could include holdlines but not a parallel taxiway(s). It should be noted that, as embodied herein, employing a derivation technique to establish a runway awareness zone with a buffer may not be necessary when data provided by one or more data sources may already be representative of a runway awareness zone which includes a buffer.

Figure 4A:
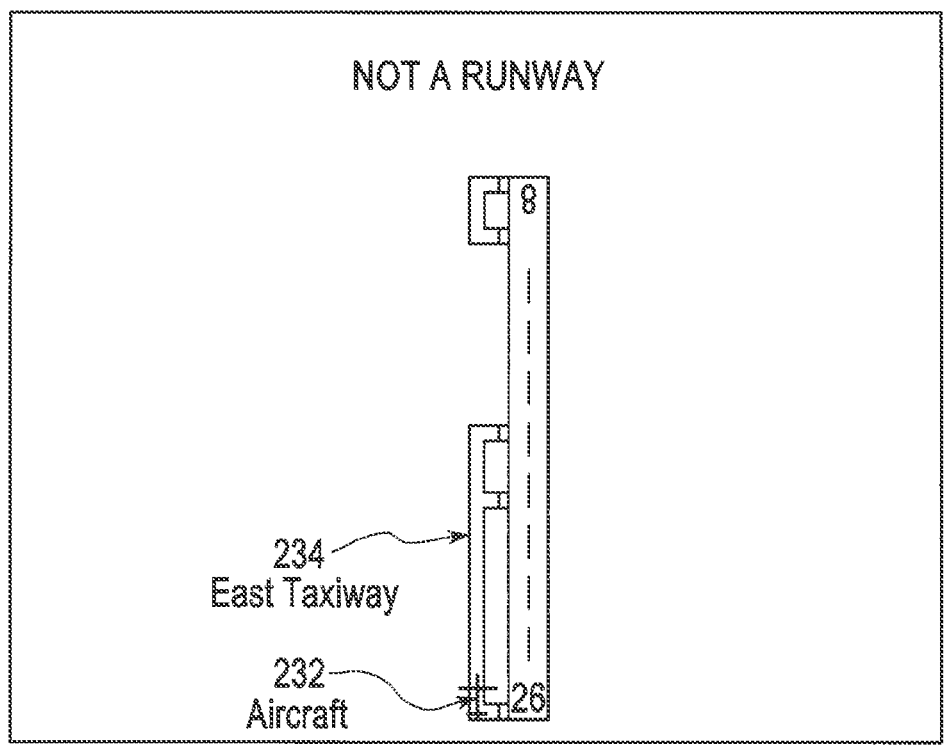
FIG. 4A illustrates a depiction of runway advisory information on a strategic display unit when a takeoff is attempted from a surface that is not a runway.
Figure 4B:
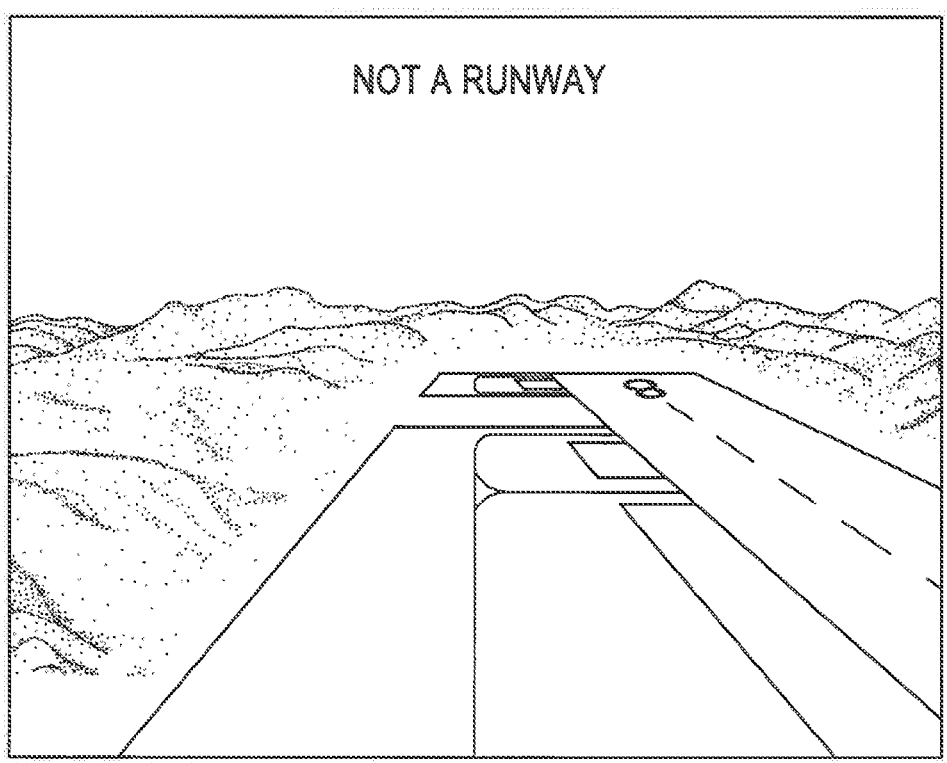
FIG. 4B illustrates an egocentric depiction of runway advisory information on a tactical display unit when a takeoff is attempted from a surface that is not a runway.

The drawings of FIG. 4 provide exemplary illustrations of how a runway alert may be generated and/or presented to the pilot when a takeoff is attempted from a surface that is not a runway. As shown in the exemplary depiction on the strategic display unit of FIG. 4A, aircraft 232 is located on east taxiway 234 adjacent to the threshold of Runway 26 and is pointed in a direction parallel to Runway 26; FIG. 4B depicts the corresponding egocentric view of a tactical display unit. This scenario could arise is a pilot were to attempt to take-off from the taxiway in a direction parallel to Runway 26 believing that it is the runway. This scenario is one in which the embodiments disclosed herein could generate and present alert information that the aircraft it taking off from a surface that is not a runway.

The AG processor 170 may determine whether an aircraft has begun the takeoff phase of flight by receiving one or more input factors 150. For example, engine(s) 167 may be placed at or above a minimum takeoff thrust level or throttle setting. Alternatively, the speed 118 above an aircraft's maximum taxi speed could indicate the aircraft has entered the takeoff phase, and speed 118 could be provided as an input factor 150. Those skilled in the art know of a plurality of configurations and/or combinations in which input factors 150 may be employed to provide input to the AG processor 170 for determining the aircraft has entered the takeoff phase of flight.

The AG processor 170 may determine whether an aircraft is taking off on a runway by constructing a runway awareness zone of one or more runways of the airport and determining whether the aircraft falls within such zone(s). If an aircraft is on the ground, has begun the takeoff phase of flight, and falls within a runway awareness zone, this could signify that the aircraft is taking off from a runway.

Additionally, the heading of the aircraft could be provided by and/or determined from one or more inputs provided by navigation system 110 and compared with the runway magnetic bearing of the runway associated with the runway awareness zone. If the heading closely corresponds to the runway magnetic bearing and the aircraft is on the ground, has begun the takeoff phase of flight, falls within a runway awareness zone, then this could signify that the aircraft is taking off from a runway. As embodied herein, the comparison between heading and runway magnetic could be included when a runway awareness zone includes a buffer zone.

As depicted on the strategic display unit of FIG. 4A, aircraft 232 is on the ground and located outside of runway awareness zone constructed for Runway 26. If the aircraft should begin a takeoff phase of flight, AG processor 170 may generate and present a runway alert to the pilot because the position of the aircraft is on the ground and has begun its takeoff, but it is located outside of the runway awareness zone.

As embodied herein, alert criteria may be established as a function of phase of flight (i.e., takeoff) and a positional relationship to a runway reference (i.e., outside a runway awareness zone). As depicted in FIGS. 4A and 4B, the AG processor 170 could be programmed or configured to generate warning alert data representative of a red textual message "NOT A RUNWAY" and/or an aural warning alert "WARNING—NOT A RUNWAY" and provide such data to a display unit and/or aural alert unit, respectively, when an aircraft is located outside of a runway awareness zone; simultaneously, the AG processor 170 could generate warning alert data representative of a red, non-textual visual warning alert highlighting a portion or all of a surface on which the aircraft is located. For example, the surface could be highlighted on a strategic display unit such as, but not limited to, a navigational surface map and/or chart. In another embodiment, textual and/or non-textual visual warning alerts could remain steady or flash intermittently. It should be noted that the use and/or selection of caution and/or warning alert criteria in this example is not limited to distance needed using normal stopping techniques but could depend on entirely different criteria as configured by a manufacturer or end-user.

Figure 5A:
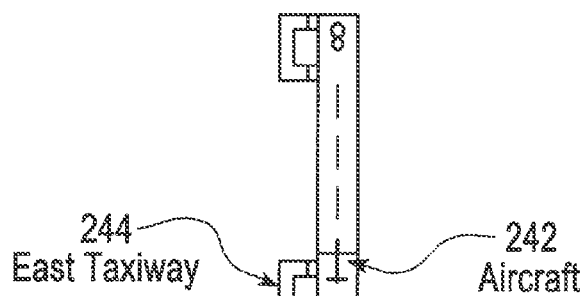
FIG. 5A illustrates a depiction of runway advisory information on a strategic display unit when a takeoff is attempted from a runway on which there is not enough takeoff distance.
Figure 5B:
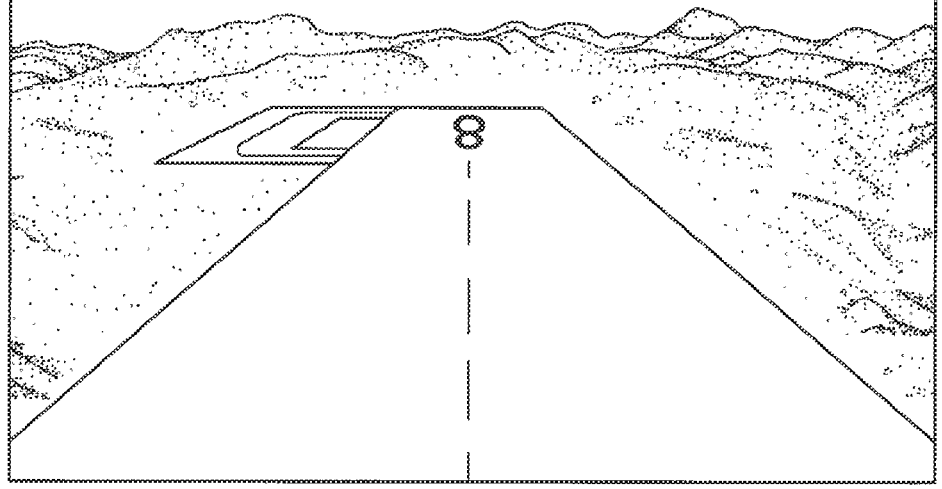
FIG. 5B illustrates an egocentric depiction of runway advisory information on a tactical display unit when a takeoff is attempted from a runway on which there is not enough takeoff distance.

The drawings of FIG. 5 provide exemplary illustrations of how a runway alert may be generated and/or presented to the pilot when a takeoff is attempted from a runway in which there is not enough takeoff distance. As shown in the exemplary depiction on the strategic display unit of FIG. 5A, aircraft 242 is "holding in position" and set for takeoff on a portion Runway 26; FIG. 5B depicts the corresponding egocentric view of a tactical display unit. This scenario could arise is a pilot were to attempt a mid-field takeoff abeam the western edge of the east taxiway 244. This scenario is one in which the embodiments disclosed herein could generate and present alert information that the aircraft it taking off from a surface of insufficient distance for takeoff as determined by applying one or more input factors 150 to takeoff performance criteria of the aircraft. Although this illustration depicts a shortened runway takeoff, the principles discussed apply equally to a takeoff which utilizes the full length of the runway but the runway is simply too short to begin with.

To provide a simple example of how input factors 150 may be used in the embodiments herein, suppose takeoff performance comprises meteorological or environmental criteria such as pressure altitude, temperature, wind, and weight. Those skilled in the art understand that a takeoff may be affected by, a plurality of factors including, but not limited to, pressure altitude, temperature, humidity, wind, runway surface conditions, runway slope, and weight. Here, factors representing altitude 114, temperature 152, barometric pressure 153, dew point 154, wind direction 155, wind speed 156, and current weight 157 may be provided as input factors 150 to AG processor 170 for subsequent processing in accordance with the criteria that defines the takeoff performance. The AG processor 170 could be programmed or configured to determine takeoff distance that is real-time because such determination is based upon real-time input factors 150. Alternatively, the AG processor 170 could accept a takeoff distance value from other sources including, but not limited to, the FMS 140, Other Aircraft Systems, a default value (not shown) determined by a manufacturer or end user, or pilot input (not shown).

For the purposes of this illustration, assume that AG processor 170 has determined the distance between aircraft 242 and LTP.212 to be 4,000 feet based upon one or more inputs from navigation system 110 and a navigation reference data source 130; however, the application of one or more input factors 150 to criteria defining takeoff performance results is a determination that 4,500 feet is needed for takeoff.

As embodied herein, alert criteria may be established as a function of phase of flight (i.e., takeoff), a positional relationship to a runway reference (i.e., inside a runway awareness zone), and sufficiency of runway distance (i.e., insufficient takeoff distance). As depicted in FIGS. 5A and 5B, the AG processor 170 could be programmed or configured to generate alert data representative of an amber or yellow textual message "RUNWAY TOO SHORT" and/or an aural warning alert "CAUTION—RUNWAY TOO SHORT" and provide such data to a display unit and/or aural alert unit, respectively, when there is insufficient distance to successfully complete a takeoff but sufficient distance to bring the aircraft to a stop using normal stopping techniques as determined by stopping criteria for the specific aircraft, where such criteria are known to those skilled in the art; simultaneously, the AG processor 170 could generate caution data representative of an amber or yellow, non-textual visual caution alert highlighting the portion of a surface on which the aircraft is located. In another embodiment, textual and/or non-textual visual caution alerts could remain steady or flash intermittently.

If there is insufficient distance to bring the aircraft to a stop using normal stopping techniques, the AG processor 170 could be programmed or configured to generate alert data representative of an red textual message "RUNWAY TOO SHORT" and/or an aural warning alert "WARNING—RUNWAY TOO SHORT" and provide such data to a display unit and/or aural alert unit, respectively; simultaneously, the AG processor 170 could generate warning data representative of an red, non-textual visual caution alert highlighting a portion or all of a surface on which the aircraft is located. For example, the runway could be highlighted on a strategic display unit such as, but not limited to, a navigational surface map and/or chart. In another embodiment, textual and/or non-textual visual warning alerts could remain steady or flash intermittently.

As embodied herein, a runway awareness zone may be employed in the highlighting of a takeoff and/or landing runway that is stored in the FMS 140. Based on the runway awareness zone of an FMS runway, AG processor 170 may generate non-alert data representative of non-textual, non-alert highlighting the takeoff runway and/or landing runway on a strategic display unit such as, but not limited to, a navigational surface map and/or chart. Also, highlighting could depend on phase of flight where one color may be used for an aircraft on the ground and another for an aircraft in flight. In an additional embodiment, data representative of the directionality of the FMS runway may be generated and presented.

Figure 6A:
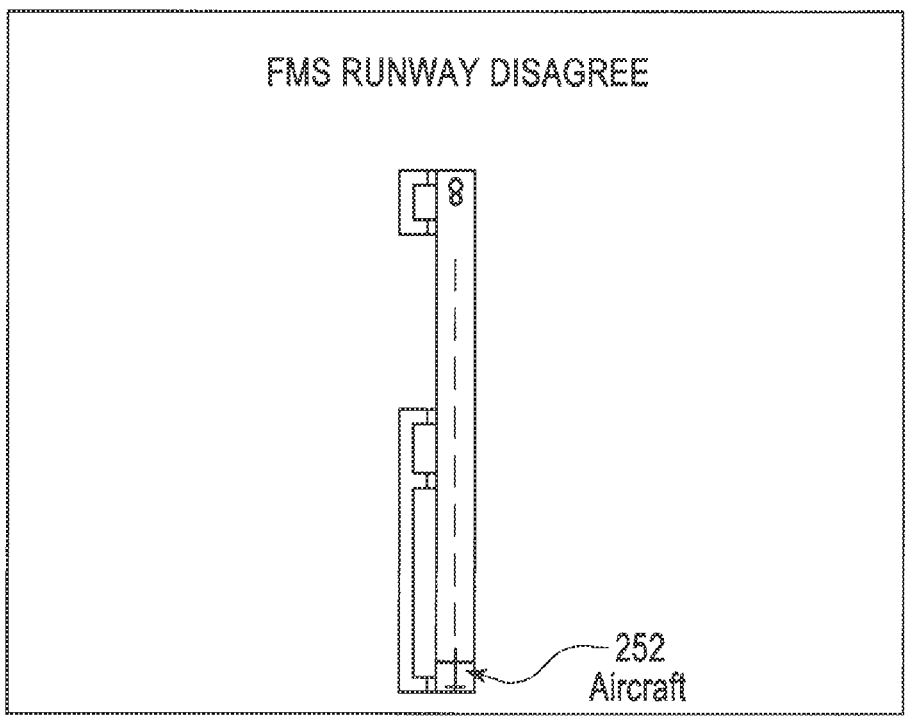
FIG. 6A illustrates a depiction of runway advisory information on a strategic display unit when a takeoff is attempted from a runway that is not the takeoff runway.
Figure 6B:
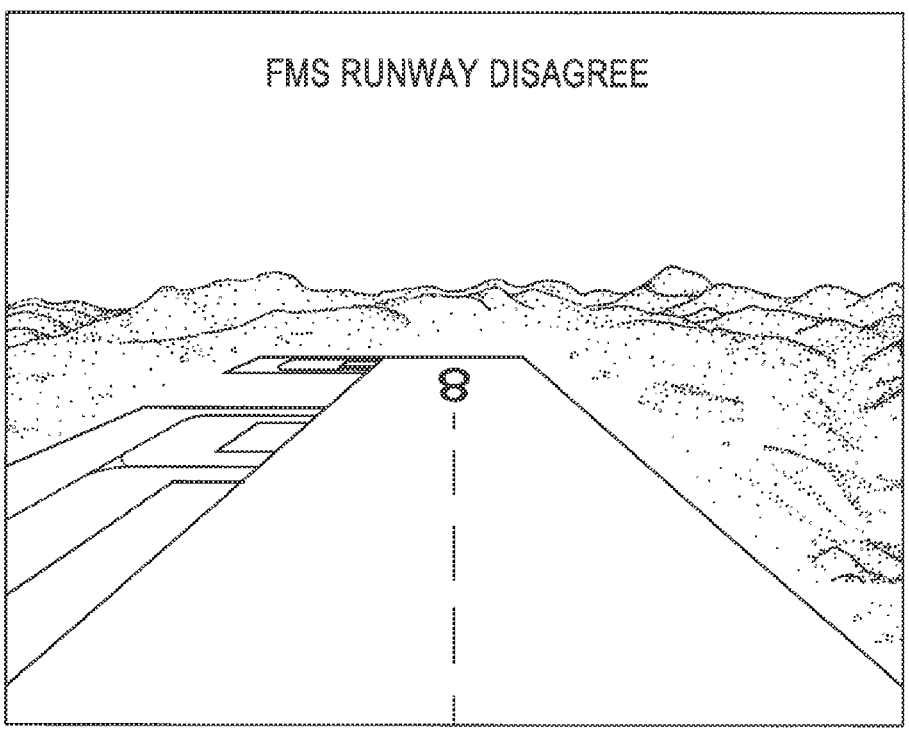
FIG. 6B illustrates an egocentric depiction of runway advisory information on a tactical display unit when a takeoff is attempted from a runway that is not the takeoff runway.

The drawings of FIG. 6 provide exemplary illustrations of how a runway alert may be generated and/or presented to the pilot when a takeoff is attempted from a runway that is different from a takeoff runway stored in the FMS 140. As shown in the exemplary depiction on the strategic display unit of FIG. 6A, aircraft 252 is "holding in position" and set for takeoff on Runway 26, but the takeoff runway stored in the FMS 140 is Runway 8; FIG. 6B depicts the corresponding egocentric view of a tactical display unit.

As embodied herein, alert criteria may be established as a function of phase of flight (i.e., takeoff), a positional relationship to a runway reference (i.e., runway magnetic bearing of FMS takeoff runway), and runway agreement (i.e., aircraft heading). As depicted in FIGS. 6A and 6B, the AG processor 170 could be programmed or configured to generate warning alert data representative of a red textual message "FMS RUNWAY DISAGREE" and/or an aural warning alert "WARNING—FMS RUNWAY DISAGREE" and provide such data to a display unit and/or aural alert unit, respectively, when there is a disagreement with an FMS-stored takeoff runway; simultaneously, the AG processor 170 could generate warning alert data representative of a red, non-textual visual warning alert highlighting a portion or all of a surface on which the aircraft is located. For example, the runway could be highlighted on a strategic display unit such as, but not limited to, a navigational surface map and/or chart. In another embodiment, textual and/or non-textual visual warning alerts could remain steady or flash intermittently.

Figure 7A:
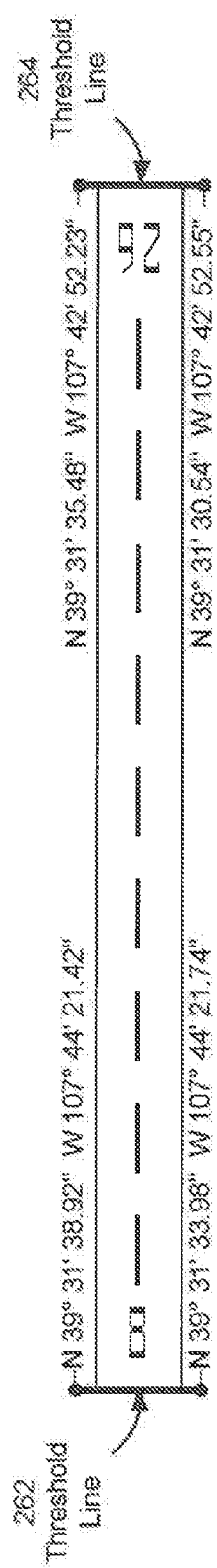
FIG. 7A illustrates two runway threshold lines of a runway.

The drawings of FIG. 7 depict Runway 8-26 at RIL along with two threshold lines and a landing awareness zone. The navigation reference data source 130 may be employed for delineating the end points of a runway threshold lines and boundaries of a landing awareness zone. Similar to the techniques applied above for a runway awareness zone, there are a plurality of techniques in which a runway threshold line may be determined from which a manufacturer or end-user may choose in establishing a runway threshold line. For example, the same techniques used in the derivation of the four corners used to delineate the runway awareness zone 228 of FIG. 3B could be used to establish the points which define threshold lines 262 and 264 (shown as thick lines) with latitude/longitude coordinates. In one embodiment, each threshold line 262 and 264 could be a reference line passing through an LTP and perpendicular to the runway centerline, where the direction of the centerline may be determined using LTP 202 and LTP 206 as discussed above.

In an alternative embodiment, each threshold line 262 and 264 could be a reference line passing through LTP 212 or 214 and 90 degrees from the magnetic bearing 214 or 218, respectively, as shown in FIG. 3A. In either embodiment, the length of the threshold line may be greater than the width of the runway. For the purposes of the illustration of FIG. 7A and not of limitation, runway threshold lines 262 and 264 are assumed to be fixed at 500 feet, where each line extends 250 feet to each side of the LTP 212 and 216, respectively. As embodied herein, a manufacturer or end-user may choose to establish a fixed- or variable-length runway threshold line by another method.

Similar to the runway awareness zone discussed above, a runway threshold line could be moved or modified to provide a buffer. For example, the shortening of a runway threshold line could provide a buffer. In another example, a runway threshold line could be selected to coincide with one of the delineated boundaries of runway awareness zone having a buffer zone. In another example, an LTP could be offset or another reference point could be used or created. As embodied herein, a manufacturer or end-user may have a plurality of options from which to choose how a runway threshold line may provide a buffer.

It should be noted that, as embodied herein, employing a derivation technique to establish a runway threshold line(s) may not be necessary when data provided by one or more data sources may already be representative of such runway threshold line(s); for example, the latitude/longitude coordinates used for delineating the end points of each runway threshold line may be provided by one or more data sources. As embodied herein, a runway threshold line(s) may be established in a plurality of ways.

Figure 7B:
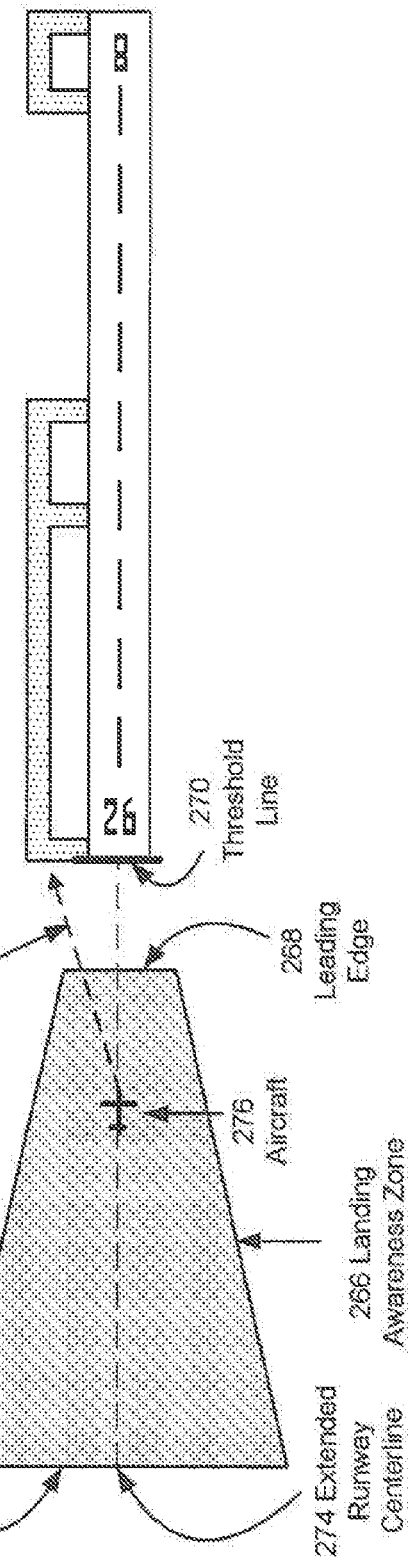
FIG. 7B illustrates a runway threshold line and a landing awareness zone of a runway.

As embodied herein, there are a plurality of techniques in which a landing awareness zone 266 may be constructed. As depicted in FIG. 7B, landing awareness zone 266 is assumed to have been configured by a manufacturer or end-user as a trapezoid, where the leading edge 268 has been configured to be 954 feet from the runway threshold line 270 and the trailing edge 272 has been configured to be 5,724 feet from the runway threshold line 270. Those skilled in the art would recognize that these values approximately correspond with two points along a 3 degree glide slope extending along a extended runway centerline 274 from the LTP (not shown), where the first point is a point along the glide slope and extended runway centerline 274 has a height of 50 feet above the LTP elevation and the second point is a point along the glide slope and extended runway centerline 274 has a height of 300 feet above the LTP elevation. Although not depicted, the length of the leading edge 268 has been configured to be approximately 500 feet (or 250 feet on each side of and perpendicular to the extended runway centerline 274) and the length of the trailing edge 272 has been configured to be approximately 1200 feet (or 600 feet on each side of and perpendicular to the extended runway centerline 274). It should be noted that, although this example provides a simple geometric shape made up of straight lines to define a landing awareness zone, the embodiments herein are not limited to such a shape but may include any fixed or variable geometric configuration chosen and/or selected by a manufacturer or end-user. Also, leading edge 268 could be configured to coincide with the width of the runway at the LTP.

FIG. 7B also depicts an aircraft 276 having a projected ground track located outside a runway threshold line 270, where such flight path may be computed by using aircraft position data provided by navigation system 110. As embodied herein, projected ground track 278 and landing awareness zone 266 may employed as part of a function for generating a runway alert and/or presenting such alert to the pilot.

Figure 8A:
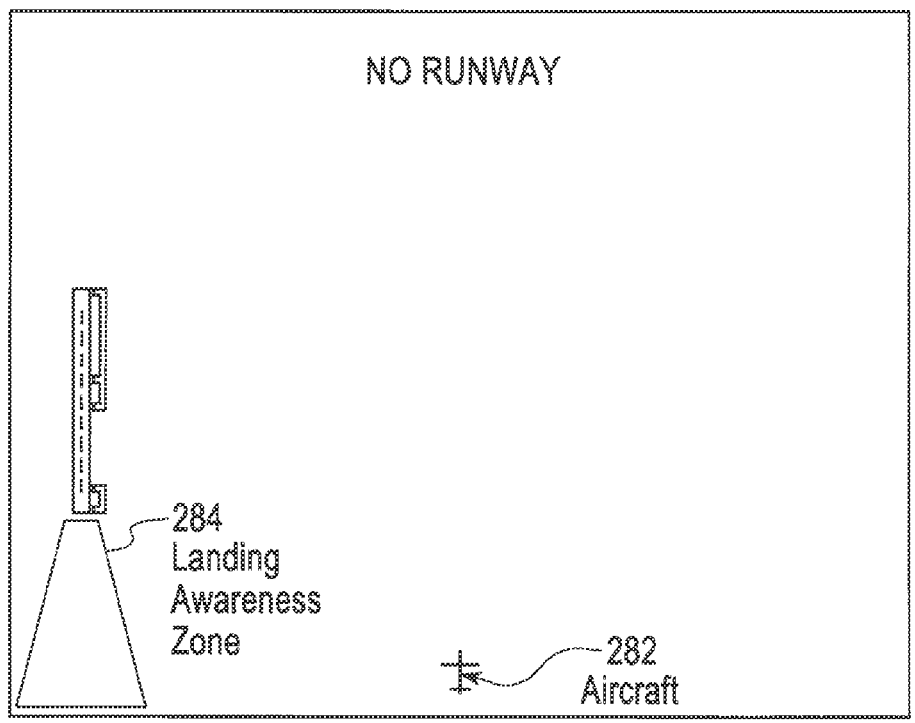
FIG. 8A illustrates a depiction of runway advisory information on a strategic display unit when an aircraft is preparing to land but it is located outside of a landing awareness zone.
Figure 8B:
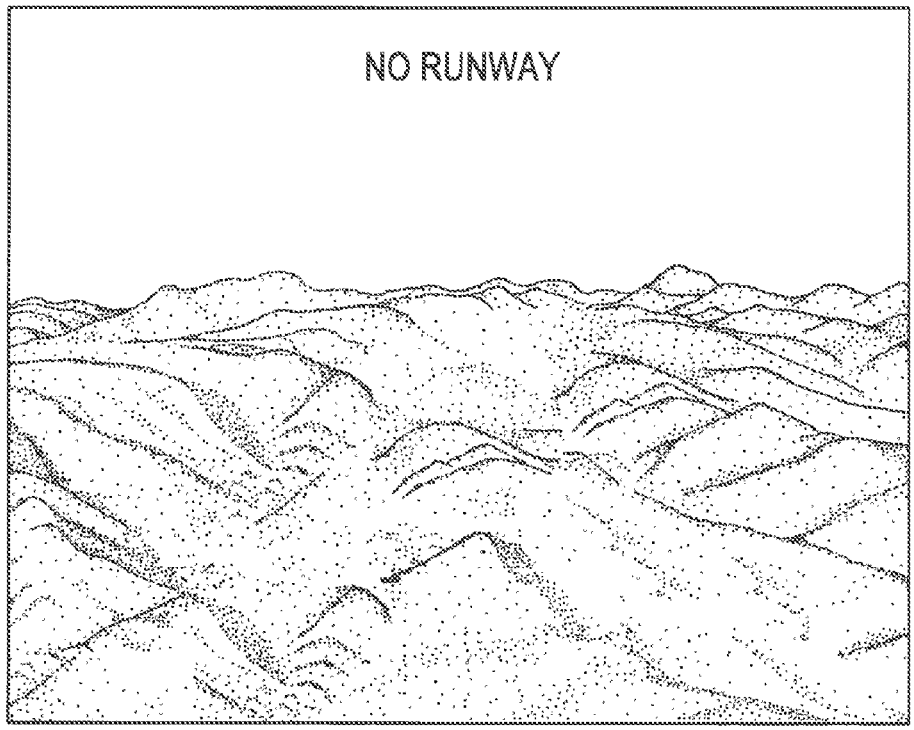
FIG. 8B illustrates an egocentric depiction of runway advisory information on a tactical display unit when an aircraft is preparing to land but it is located outside of a landing awareness zone.

The drawings of FIG. 8 provide exemplary illustrations of how a runway alert may be generated and/or presented to the pilot when the aircraft has been placed into its landing configuration, but it is located outside of the landing awareness zone. As shown in the exemplary depiction on the strategic display unit of FIG. 8A, aircraft 282 is located generally north of airport and flying in the easterly direction of Runway 8; FIG. 8B depicts the corresponding egocentric view of a tactical display unit. Although the use of a landing awareness zone 284 is generally transparent to the pilot and not depicted on a strategic display unit, a landing awareness zone has been included in the depiction of FIG. 8A for the purpose of discussion only.

The AG processor 170 may determine whether the aircraft in flight has been placed into a landing configuration and has begun a final approach phase of flight. The AG processor 170 may determine whether an aircraft has been placed into a landing configuration by receiving one or more input factors 150. For example, flaps/slats 163 may be placed in a landing configuration and landing gear 166 could indicate a "down and locked" position. Those skilled in the art know of a plurality of configurations and/or combinations in which input factors 150 may be employed to provide input to the AG processor 170 for determining the aircraft has entered the final approach phase of flight.

The AG processor 170 may determine whether an aircraft has begun its final approach phase of flight by constructing a landing awareness zone 284 and determining whether an aircraft placed in a landing configuration is located within such zone(s). If an aircraft in flight has been placed into a landing configuration and falls within a landing awareness zone 284, this could signify that the aircraft has begun its final approach phase.

As depicted on the strategic display unit of FIG. 8A, aircraft 282 is in flight but is assumed to be outside of landing awareness zone 284 that has been constructed for Runway 8. The AG processor 170 may generate and present a runway alert to the pilot if the aircraft in flight has been placed into its landing configuration, but it is located outside of the landing awareness zone.

As embodied herein, alert criteria may be established as a function of phase of flight (i.e., final approach) and a positional relationship to a runway reference (i.e., outside a landing awareness zone). As depicted in FIGS. 8A and 8B, the AG processor 170 could be programmed or configured to generate warning alert data representative of a red textual message "NO RUNWAY" and/or an aural warning alert "WARNING—NO RUNWAY" and provide such data to a display unit and/or aural alert unit, respectively, when an aircraft is located outside of a landing awareness zone; simultaneously, the AG processor 170 could generate warning alert data representative of a red, non-textual visual warning alert highlighting a portion or all of the airport. In another embodiment, textual and/or non-textual visual warning alerts could remain steady or flash intermittently.

In an additional embodiment, alert criteria could include altitude. This could be beneficial in instances where an aircraft in flight could be placed into a landing configuration prior to arriving at a landing awareness zone. If this instance, an alert may be suppressed until the aircraft has reached an altitude as configured by a manufacturer or end-user. For the purpose of illustration and not as limitation, assume the altitude has been configured for an altitude of 300 feet above a reference elevation and that the reference elevation is the elevation of the applicable LTP. Then, the reference elevation for Runway 26 is 5,544 feet as shown in FIG. 3A. If an aircraft has been placed into a landing configuration, the alerts of the preceding paragraph may be suppressed if the aircraft is operating at an altitude of 5,844 feet or above.

Figure 9A:
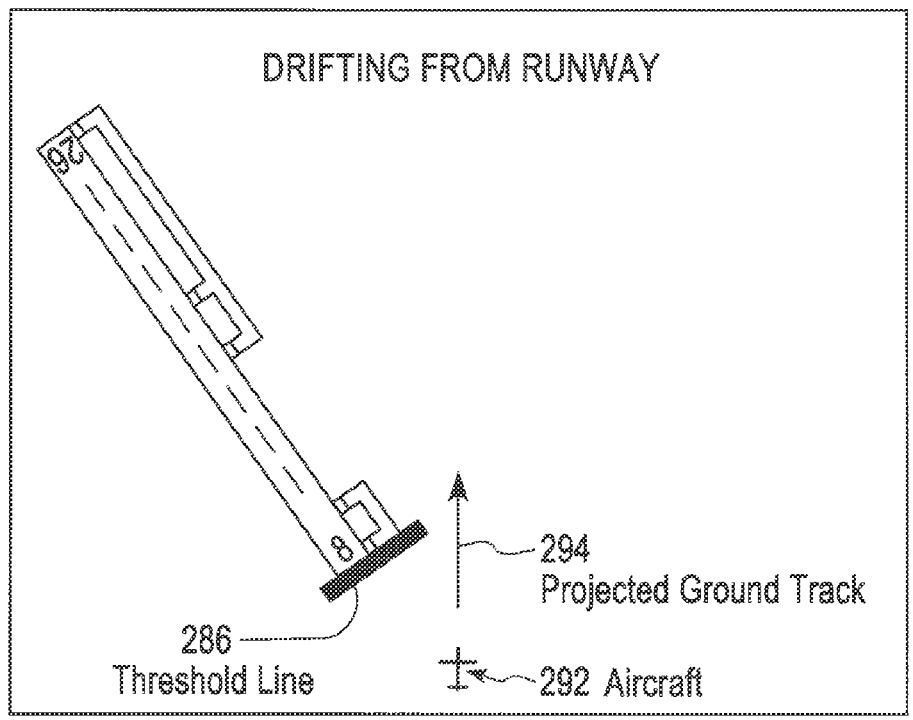
FIG. 9A illustrates a depiction of runway advisory information on a strategic display unit when the aircraft is located on the final approach phase but has drifted away from a runway.
Figure 9B:
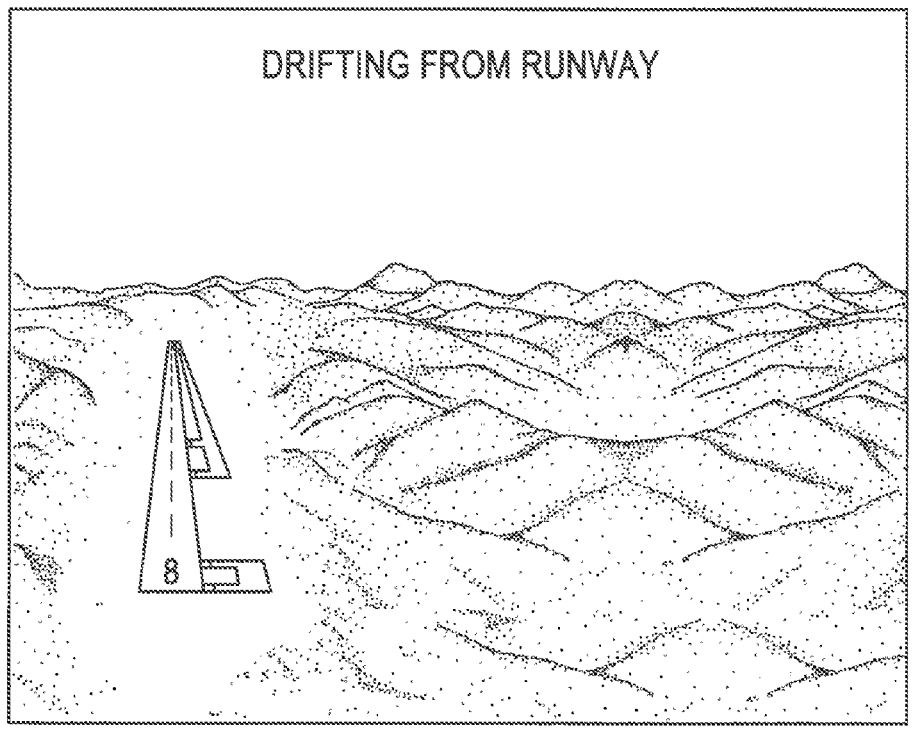
FIG. 9B illustrates an egocentric depiction of runway advisory information on a tactical display unit when the aircraft is located on the final approach phase but has drifted away from a runway.

The drawings of FIG. 9 provide exemplary illustrations of how a runway alert may be generated and/or presented to the pilot when the aircraft has begun its final approach phase but ends up drifting away from a runway. As shown in the exemplary depiction on the strategic display unit of FIG. 9A, aircraft 292 is located to the west of airport and approaching Runway 8 but drifting generally to the south indicated by projected ground track 294; FIG. 9B depicts the corresponding egocentric view of a tactical display unit. If aircraft 292 continues on its projected ground track 294 which, the aircraft would end up in position to miss landing on the runway. The AG processor 170 may generate and present a runway alert to the pilot if the aircraft in flight has begun its final approach phase, but the flight path 294 is located outside of a runway threshold line 296. Although the use of a runway threshold line 296 is generally transparent to the pilot and not depicted on a strategic display unit, a runway threshold line has been included in the depiction of FIG. 9A for the purpose of discussion.

As embodied herein, alert criteria may be established as a function of phase of flight (i.e., final approach) and a positional relationship to a runway reference (i.e., outside a runway threshold line). As depicted in FIGS. 9A and 9B, the AG processor 170 could be programmed or configured to generate warning alert data representative of a red textual message "DRIFTING FROM RUNWAY" and/or an aural warning alert "WARNING—DRIFTING FROM RUNWAY" and provide such data to a display unit and/or aural alert unit, respectively, when the projected ground track of an aircraft on a final approach is located outside of a runway threshold line; simultaneously, the AG processor 170 could generate warning alert data representative of a red, non-textual visual warning alert highlighting all or part of the airport. In another embodiment, textual and/or non-textual visual warning alerts could remain steady or flash intermittently.

Figure 10A:
FIG. 10A illustrates a depiction of runway advisory information on a strategic display unit when there is not enough landing and stopping distance of a runway corresponding to the final approach.

The drawings of FIG. 10 provide exemplary illustrations of how a runway alert may be generated and/or presented to the pilot when there is not enough landing and stopping distance of a runway corresponding to the final approach of aircraft 302. As shown in the exemplary depiction on the strategic display unit of FIG. 10A, aircraft 292 is located to the west of airport and approaching Runway 8; FIG. 8B depicts the corresponding egocentric view of a tactical display unit. This scenario is one in which the embodiments disclosed herein could generate and present alert information that the aircraft is preparing to land on a surface of insufficient distance as determined by applying one or more input factors 150 to landing and stopping performance criteria of the aircraft.

To provide a simple example of how input factors 150 may be used in the embodiments herein, suppose landing and stopping performance comprises meteorological or environmental criteria such as pressure altitude, temperature, wind, and weight. Similar to the discussion above about takeoff performance, those skilled in the art understand that landing and stopping distance may be affected by a plurality of factors and factors representing altitude 114, temperature 152, barometric pressure 153, dew point 154, wind direction 155, wind speed 156, and current weight 157 may be provided as input factors 150 to AG processor 170 for subsequent processing in accordance with the criteria that defines the landing and stopping performance. The AG processor 170 could be programmed or configured to determine landing and stopping distance that is real-time because such determination is based upon real-time input factors 150. Alternatively, the AG processor 170 could accept a landing distance value from other sources including, but not limited to, FMS 140, Other Aircraft Systems 136, a default value determined by a manufacturer or end-user, or pilot input.

Figure 10B:
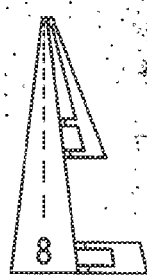
FIG. 10B illustrates an egocentric depiction of runway advisory information on a tactical display unit when there is not enough landing and stopping distance of a runway corresponding to the final approach.

For the purposes of this illustration, assume that AG processor 170 has applied of one or more input factors 150 to criteria defining landing and stopping performance results and determined that a distance of 7,500 feet is needed for landing and stopping, but as shown in FIG. 3A, the length of the runway is 7,000 feet. As embodied herein, alert criteria may be established as a function of phase of flight (i.e., final approach), a positional relationship to a runway reference (i.e., inside a runway awareness zone), and sufficiency of distance (i.e., insufficient landing and stopping distance). As depicted in FIGS. 10A and 10B, the AG processor 170 could be programmed or configured to generate alert data representative of a red textual message "RUNWAY TOO SHORT" and/or an aural warning alert "WARNING—RUNWAY TOO SHORT" and provide such data to a display unit and/or aural alert unit, respectively, when there is insufficient distance to successfully complete a landing and rollout; simultaneously, the AG processor 170 could generate warning data representative of a red, non-textual visual caution alert highlighting the surface on which the aircraft is prepared to land. For example, the runway could be highlighted on a strategic display unit such as, but not limited to, a navigational surface map and/or chart. In another embodiment, textual and/or non-textual visual warning alerts could remain steady or flash intermittently.

Alternatively, the AG processor 170 could be programmed or configured to generate alert data representative of an amber or yellow textual message "RUNWAY TOO SHORT" and/or an aural warning alert "CAUTION—RUNWAY TOO SHORT" and provide such data to a display unit and/or aural alert unit, respectively; simultaneously, an AG processor 170 could generate caution data representative of an amber or yellow, non-textual visual caution alert highlighting the surface on which the aircraft is prepared to land. In another embodiment, textual and/or non-textual visual caution alerts could remain steady or flash intermittently. It should be noted that the use and/or selection of warning and/or caution alert criteria in this example could be configurable by a manufacturer or end-user.

Figure 11A:
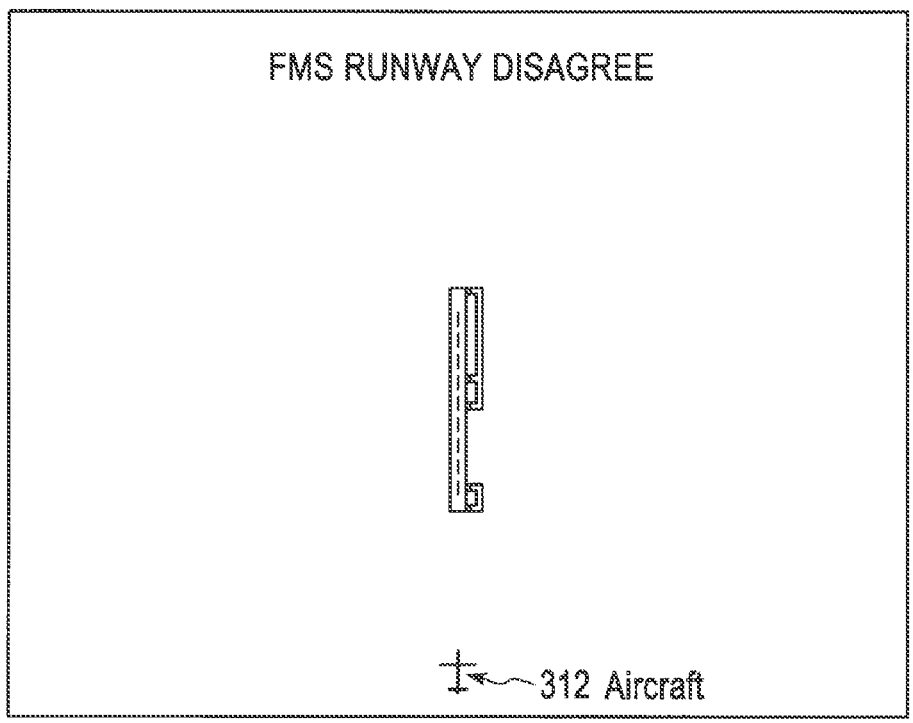
FIG. 11A illustrates a depiction of runway advisory information on a strategic display unit when attempting to land on a runway that is not the landing runway.
Figure 11B:
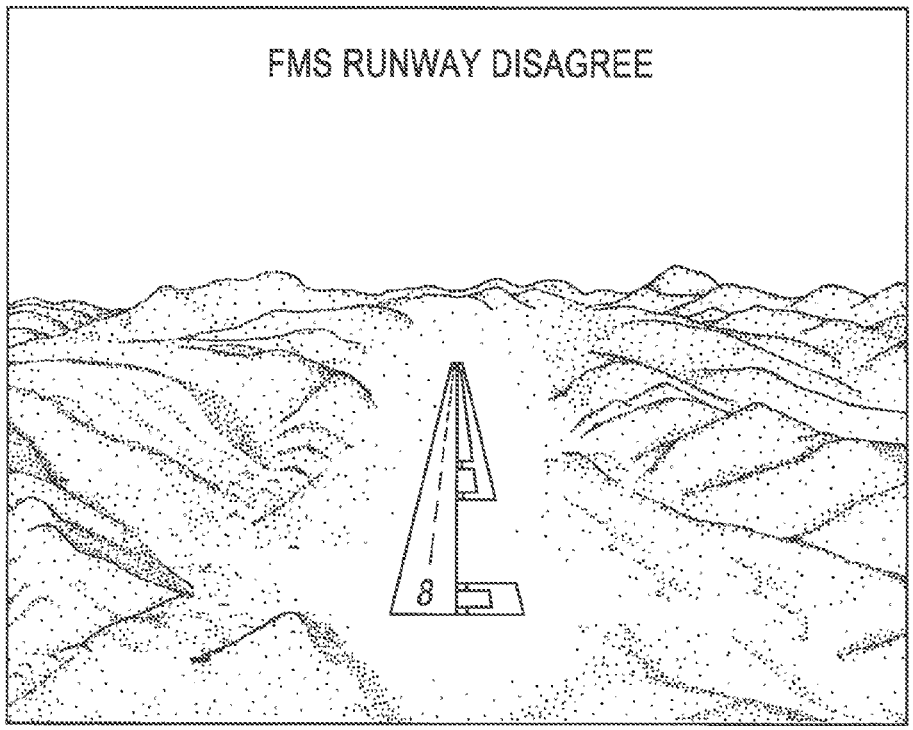
FIG. 11B illustrates an egocentric depiction of runway advisory information on a tactical display unit when attempting to land on a runway that is not the landing runway.

The drawings of FIG. 11 provide exemplary illustrations of how a runway alert may be generated and/or presented to the pilot when preparing to land on a runway that is different from a landing runway stored in an FMS 140. As shown in the exemplary depiction on the strategic display unit of FIG. 11A, aircraft 312 is preparing to land on Runway 8, but the landing runway stored in the FMS 140 is Runway 26; FIG. 11B depicts the corresponding egocentric view of a tactical display unit.

As embodied herein, alert criteria may be established as a function of phase of flight (i.e., takeoff), a relationship to a runway reference (i.e., runway magnetic bearing of FMS takeoff runway), and runway agreement (i.e., aircraft heading). As depicted in FIGS. 11A and 11B, the AG processor 170 could be programmed or configured to generate warning alert data representative of a red textual message "FMS RUNWAY DISAGREE" and/or an aural warning alert "WARNING—FMS RUNWAY DISAGREE" and provide such data to a display unit and/or aural alert unit, respectively, when there is a disagreement with an FMS-stored landing runway; simultaneously, the AG processor 170 could generate warning alert data representative of a red, non-textual visual warning alert highlighting the surface on which the aircraft is prepared to land. For example, the runway could be highlighted on a strategic display unit such as, but not limited to, a navigational surface map and/or chart. In another embodiment, textual and/or non-textual visual warning alerts could remain steady or flash intermittently.

Figure 12:
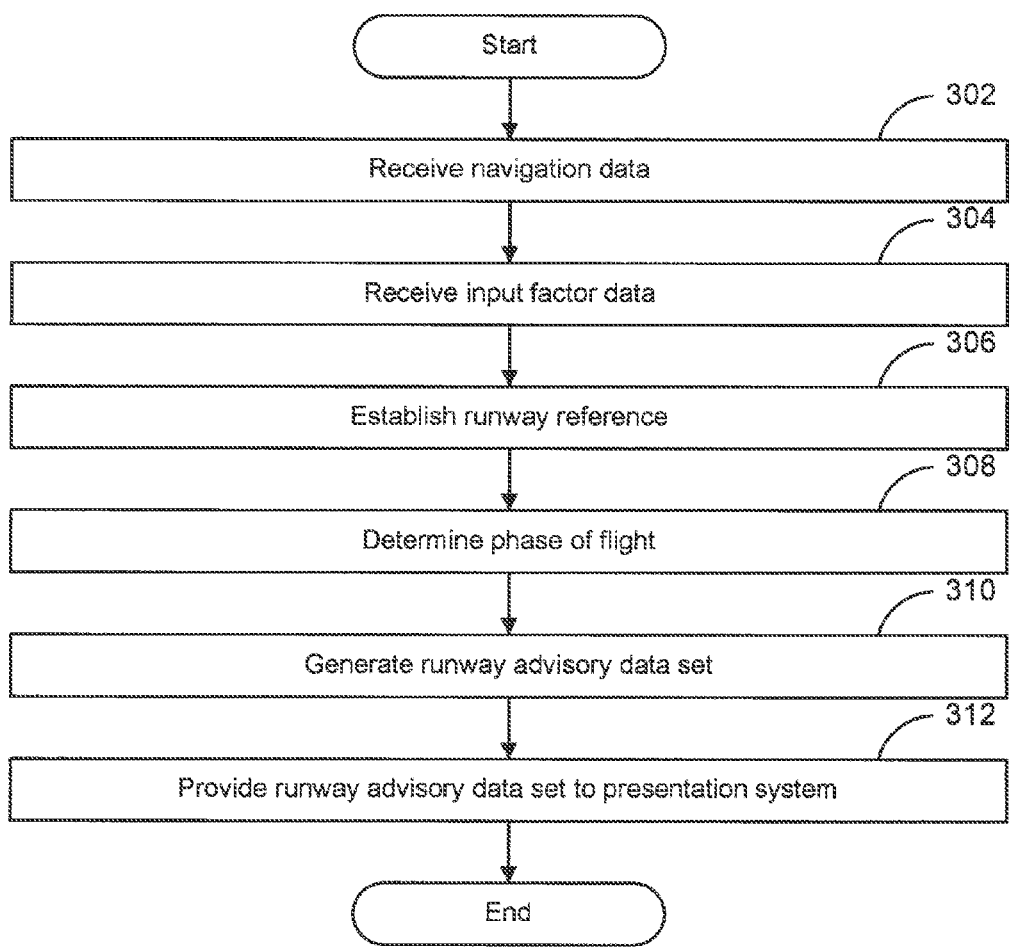
FIG. 12 depicts a flowchart of a method for presenting runway traffic information.

FIG. 12 depicts a flowchart 300 of an example of a method for presenting runway advisory information. The flowchart begins with module 302 with the receiving of navigation data by the AG processor 170 from a navigation data source where such data includes data representative of at least aircraft location information. Additional navigation data may be received depending on the use as configured by a manufacturer or end-user. For example, data representative of speed 118 as an input factor could be used in determining phase of flight, heading 122 could be used to compare with runway bearing data, and altitude 114 could be used to suppress an alert occurring during a final approach phase of flight. In an additional embodiment, data could be provided by the FMS system 140 representative of an FMS runway.

The flowchart continues with module 304 with the receiving of input factor data from an input factor data source 150. As stated above, input factors 150 may be provided by a plurality of aircraft systems or components thereof. As embodied herein, a source of input factors may comprise of one aircraft system or a collection of more than one aircraft system that may provide input factor(s). As embodied herein, an input factor 150 could provide data or a signal of any form containing information that may be provided to and/or received by the AG processor 170. As embodied herein, input factors 150 could include those inputs defined above as being part of the navigation system 110. That is, navigation system 110 and/or other aircraft systems may be considered as part of an input factor data source providing a subset of input factors 150.

The flowchart continues with module 306 with the establishing of a runway reference using navigation reference data received from a navigation reference data source. As embodied herein, navigation reference data source 130 could include taxi navigation database 132, flight navigation database 134, and/or another aircraft system 136. In an embodiment disclosed herein, navigation reference data received could correspond to the aircraft location and direction of flight. In another embodiment disclosed herein, navigation reference data received could correspond to a runway(s) located at a departure and/or destination airport that could be provided by FMS 140. As embodied herein, the receiving of any data by the AG processor 170 or the providing of data to an AG processor 170 may inherently include a step in which the processor performs a retrieval operation of such data.

In one embodiment, navigation reference data may be comprised of data representative of runway information including, but not limited to, at least LTP, the elevation of the LTP, runway width, the magnetic bearing, and the magnetic variation of the runway, which may be received by AG processor 170, either in part or in whole, to delineate a runway awareness zone, thereby establishing a runway awareness zone. In another embodiment, data representative of a runway awareness zone may be received by a processor, thereby establishing a partitioned runway awareness zone. As embodied herein, a runway awareness zone could provide a buffer zone by extending and/or expanding beyond the boundaries of a runway including, but not limited to, adding displaced threshold information contained in the navigation reference data.

The flowchart continues with module 308 with the determining of a phase of flight using input factor data. For example, speed 118 provided by navigation system 110 and engine(s) 167 could be used in determining a takeoff phase of flight. In another example, flaps/slats 163 and landing gear 166 could be used in determining final approach phase of flight.

In an additional embodiment, input factors may be used to determine sufficiency of distance. Input factors representative of altitude 114, temperature 152, barometric pressure 153, dew point 154, wind direction 155, wind speed 156, and/or current weight 157 could be applied to aircraft performance equations to determine a takeoff and/or landing and rollout distances. Given additional inputs of aircraft location and/or position received from the navigation system 110 and runway length information based upon data provided by the navigation reference database 130, an advisory may be generated. Alternatively, the AG processor 170 could accept a distance value from other sources including but not limited to, the FMS 140, Other Aircraft Systems 136, a default value determined by the airplane manufacturer or operator, or pilot input.

The flowchart continues with module 310 with the generating of runway advisory data set by the AG processor 170 and module 312 with the providing of the advisory data set to presentation system 180. A runway advisory data set may be generated as a function of phase of flight and the positional relationship between aircraft location and the runway reference, where the runway data set that is generated may be representative of one or more of the following forms of advisory information: visual runway advisory information that may be presented on at least one display unit, aural runway advisory information that may be presented through an aural alert unit, and/or tactile advisory information that may be presented through a tactile alert unit. As embodied herein, visual runway advisory information could be textual information, non-textual information, or both.

In an application of the function, a phase of flight could be determined to be takeoff and the aircraft could be located outside of a runway awareness zone. If these conditions are true, a runway advisory data set representative of visual textual runway advisory information and/or aural runway advisory information such as "NOT A RUNWAY" and "WARNING—NOT A RUNWAY," respectively, could be generated, and visual non-textual runway advisory information could be generated such as changing the appearance of a surface depicted on a display unit.

In another application of the function, a phase of flight could be determined to be final approach and the aircraft could be located outside of a landing awareness zone. If these conditions are true, a runway advisory data set representative of visual textual runway advisory information and/or aural runway advisory information such as "NO RUNWAY" and "WARNING—NO RUNWAY," respectively, could be generated, and visual non-textual runway advisory information could be generated. In an additional embodiment, the function could include the altitude of the aircraft such that the generation of the runway advisory data set may be suppressed until the aircraft has reached a predetermined altitude as configured by a manufacturer or end-user.

In another application of the function, a phase of flight could be determined to be final approach and the projected ground track of the aircraft could be located outside of a runway threshold line. Additionally, the aircraft could be located inside of a landing awareness zone. If these conditions are true, a runway advisory data set representative of visual textual runway advisory information and/or aural runway advisory information such as "DRIFTING FROM RUNWAY" and "WARNING—DRIFTING FROM RUNWAY," respectively, could be generated, and visual non-textual runway advisory information could be generated such as changing the appearance of a surface depicted on a display unit.

In an additional embodiment herein, a runway data set may be generated as a function of phase of flight, the positional relationship between aircraft location, and sufficiency of runway distance. In one application of the function, a phase of flight could be determined to be takeoff, the aircraft could be located inside of a runway awareness zone, but the runway distance available for takeoff could be insufficient. If these conditions are true, a runway advisory data set representative of visual textual runway advisory information and/or aural runway advisory information such as "RUNWAY TOO SHORT" and "CAUTION—RUNWAY TOO SHORT," respectively, could be generated, and visual non-textual runway advisory information could be generated such as changing the appearance of a surface depicted on a display unit.

In another application of the function in the preceding paragraph, a phase of flight could be determined to be final approach, the aircraft could be located inside of a landing awareness zone, but the runway distance available for landing and stopping could be insufficient. If these conditions are true, a runway advisory data set representative of visual textual runway advisory information and/or aural runway advisory information such as "RUNWAY TOO SHORT" and "CAUTION—RUNWAY TOO SHORT," respectively, could be generated, and visual non-textual runway advisory information could be generated such as changing the appearance of a surface depicted on a display unit.

In an additional embodiment herein, a runway data set may be generated as a function of phase of flight, the positional relationship between aircraft location, and runway agreement. In one application of the function, a phase of flight could be determined to be takeoff, the aircraft could be located inside of a runway awareness zone, but the runway corresponding to the runway awareness zone may not agree with the FMS runway or the aircraft heading may not agree with the runway bearing of the FMS runway. If these conditions are true, a runway advisory data set representative of visual textual runway advisory information and/or aural runway advisory information such as "FMS RUNWAY DISAGREE" and "WARNING—FMS RUNWAY DISAGREE," respectively, could be generated, and visual non-textual runway advisory information could be generated such as changing the appearance of a surface depicted on a display unit.

In another application of the function in the preceding paragraph, a runway data set may be generated as a function of phase of flight, the positional relationship between aircraft location, and runway agreement. In one application of the function, a phase of flight could be determined to be final approach, the aircraft could be located inside of a landing awareness zone, but the runway corresponding to the landing awareness zone may not agree with the FMS runway or the aircraft heading may not agree with the runway bearing of the FMS runway. If these conditions are true, a runway advisory data set representative of visual textual runway advisory information and/or aural runway advisory information such as "FMS RUNWAY DISAGREE" and "WARNING—FMS RUNWAY DISAGREE," respectively, could be generated, and visual non-textual runway advisory information could be generated such as changing the appearance of a surface depicted on a display unit. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting runway advisory information to a pilot, said system comprising:
   a source for providing navigation data;
   a source for providing navigation reference data;
   a source for providing input factor data;
   an advisory generating processor, wherein such processor
      receives data representative of at least aircraft location from a navigation data source,
      receives data representative of at least one input factor from an input factor data source,
      establishes a runway reference using data received from the source of navigation reference data,
      determine a first value representative of a required terrain clearance altitude associated with the phase of flight and flight attitude parameter,
      generates a runway advisory data set as a function of phase of flight and the positional relationship between aircraft location and the runway reference, where
         the runway advisory data set is representative of advisory information comprised of visual runway advisory information, aural runway advisory information, tactile advisory information, or a combination thereof, and
      provides the runway advisory data set to a presentation system; and
   the presentation system, wherein such system
      receives the runway advisory data set, and
      presents advisory information represented in the advisory data set on or through at least one presentation unit, where
         each presentation unit is a visual display unit, an aural alert unit, or a tactile alert unit.

2. The system of claim 1, wherein the input factor data source is the navigation data source.

3. The system of claim 1, wherein the data received from the source of navigation reference data is representative of runway information from which at least one of the following is established using a derivation technique: runway awareness zone, landing awareness zone, and runway threshold line.

4. The system of claim 1, wherein the data received from the source of navigation reference data is representative of at least one of the following: runway awareness zone, landing awareness zone, and runway threshold line.

5. The system of claim 1, wherein
   the phase of flight is takeoff, and
   the runway reference is a runway awareness zone.

6. The system of claim 1, wherein
   the phase of flight is final approach, and
   the runway reference is a landing awareness zone, a runway threshold line, or both.

7. The system of claim 1, wherein the runway advisory data set representative of visual advisory information includes data representative of textual information, non-textual information, or both.

8. A module for presenting runway advisory information to a pilot, said module comprising:
   an input communications interface to facilitate a receiving of data by a processor from at least one data source;
   an advisory generating processor, wherein such processor
      receives data representative of aircraft location from a navigation data source,
      receives data representative of at least one input factor from an input factor data source,
      establishes a runway reference using data received from the source of navigation reference data,
      determines phase of flight based upon input factor data,
      generates a runway advisory data set as a function of phase of flight and the positional relationship between aircraft location and the runway reference, where
         the runway advisory data set is representative of advisory information comprised of visual runway advisory information, aural runway advisory information, tactile advisory information, or a combination thereof, and
      provides the runway advisory data set a presentation system, whereby
         the advisory information represented in the advisory data set is presented on or through at least one presentation unit, where each presentation unit is a visual display unit, an aural alert unit, or a tactile alert unit; and
   an output communications interface to facilitate the providing of the runway advisory data set to the presentation system.

9. The module of claim 8, wherein the input factor data source is navigation data source.

10. The module of claim 8, wherein the data received from the source of navigation reference data is representative of runway information from which at least one of the following is established using a derivation technique: runway awareness zone, landing awareness zone, and runway threshold line.

11. The module of claim 8, wherein the data received from the source of navigation reference data is representative of at least one of the following: runway awareness zone, landing awareness zone, and runway threshold line.

12. The module of claim 8, wherein
   the phase of flight is takeoff, and
   the runway reference is a runway awareness zone.

13. The module of claim 8, wherein
   the phase of flight is final approach, and the runway reference is a landing awareness zone, a runway threshold line, or both.

14. The module of claim 8, wherein the runway advisory data set representative of visual advisory information includes data representative of textual information, non-textual information, or both.

15. A method for presenting runway advisory information to a pilot, said method comprising:
   receiving data representative of aircraft location from a navigation data source,
   receiving data representative of at least one input factor from an input factor data source,
   establishing a runway reference using data received from a navigation reference data,
   determining phase of flight based upon input factor data,
   generating a runway advisory data set as a function of phase of flight and the positional relationship between aircraft location and the runway reference, where
      the runway advisory data set is representative of advisory information comprised of visual runway advisory information, aural runway advisory information, tactile advisory information, or a combination thereof, and
   providing the runway advisory data set to a presentation system, whereby
      the advisory information represented in the runway advisory data set is presented on or through at least one presentation unit, where each presentation unit is a visual display unit, an aural alert unit, or a tactile alert unit.

16. The method of claim 15, wherein the input factor data source is the navigation data source.

17. The method of claim 15, wherein the data received from the source of navigation reference data is representative of runway information from which at least one of the following is established using a derivation technique: runway awareness zone, landing awareness zone, and runway threshold line.

18. The method of claim 15, wherein the data received from the source of navigation reference data is representative of at least one of the following: runway awareness zone, landing awareness zone, and runway threshold line.

19. The method of claim 15, wherein
   the phase of flight is takeoff, and
   the runway reference is a runway awareness zone.

20. The method of claim 15, wherein
   the phase of flight is final approach, and
   the runway reference is a landing awareness zone, a runway threshold line, or both.

21. The method of claim 15, wherein the runway advisory data set representative of visual advisory information includes data representative of textual information, non-textual information, or both.

* * * * *